(12) United States Patent  (10) Patent No.: US 8,524,383 B2
Yamanaka et al.  (45) Date of Patent: Sep. 3, 2013

(54) POWER GENERATING SYSTEM AND CONTROL METHOD FOR THE SAME

(75) Inventors: Kazunori Yamanaka, Kawasaki (JP); Kazuaki Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 276 days.

(21) Appl. No.: 12/974,249

(22) Filed: Dec. 21, 2010

(65) Prior Publication Data

US 2011/0171500 A1  Jul. 14, 2011

(30) Foreign Application Priority Data

Dec. 21, 2009  (JP) ................................. 2009-289540

(51) Int. Cl.
*H01M 8/04* (2006.01)
*H01M 12/00* (2006.01)

(52) U.S. Cl.
USPC .............................................. 429/9; 429/442

(58) Field of Classification Search
USPC ............................................. 429/9, 433, 442
See application file for complete search history.

(56) References Cited

U.S. PATENT DOCUMENTS 5,789,092 A * 8/1998 Spiers et al. ............... 429/442 X
5,871,859 A * 2/1999 Parise ........................ 429/442 X
7,052,789 B2 * 5/2006 Okamoto .................... 429/442 X

FOREIGN PATENT DOCUMENTS

JP  2005-228523 A1  8/2005
JP  2007-200710 A1  8/2007

OTHER PUBLICATIONS

Computer-generated translation of JP 2005-228523, from the Japanese Patent Office website (doc date Aug. 2005).*

* cited by examiner

*Primary Examiner* — Stephen J. Kalafut
(74) *Attorney, Agent, or Firm* — Kratz, Quintos & Hanson, LLP

(57) ABSTRACT

A power generating system includes: a plurality of cells forming a fuel cell battery for generating power; a cell temperature measuring unit provided for each cell; a thermoelectric converter provided for each cell; a heating unit which heats the plurality of cells; a first control unit which controls the heating unit; and a second control unit, provided for each thermoelectric converter, for controlling the thermoelectric converter, wherein the first control unit controls the heating unit so as to bring the temperature of the heating unit to within a predetermined control temperature range, and the second control unit performs control so that if the temperature of the cell lies outside a predetermined operating temperature range, the thermoelectric converter is switched to the thermal transfer mode and is controlled so as to bring the temperature of the cell to within the predetermined operating temperature range, and if the temperature of the cell lies within the predetermined operating temperature range, the thermoelectric converter is switched to the power generation mode.

6 Claims, 16 Drawing Sheets

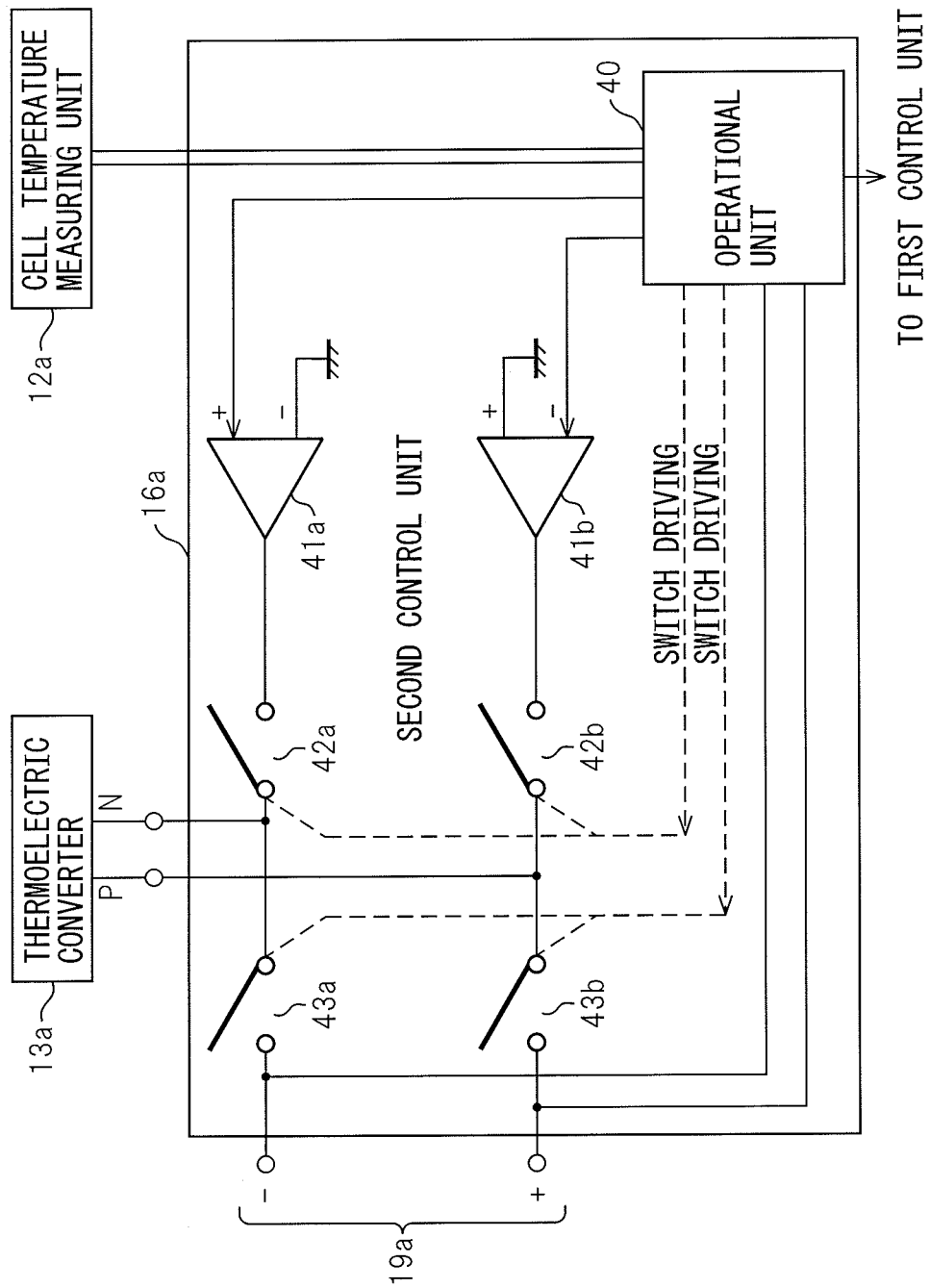

FIG.4B

| TEMPERATURE OF POWER GENERATING CELL (°C) | VOLTAGE GENERATED BY THERMOELECTRIC CONVERTER (V) | CURRENT GENERATED BY THERMOELECTRIC CONVERTER (A) | TEMPERATURE AT HEATER SIDE OF THERMOELECTRIC CONVERTER (°C) |
|---|---|---|---|
| . | . | . | . |
| . | . | . | . |
| . | . | . | . |
| 600 | 4 | 0.16 | 390 |
| 600 | 2 | 0.08 | 490 |
| 600 | 1.536 | 0.032 | 510 |
| 600 | 1 | 0.025 | 540 |
| . | . | . | . |
| . | . | . | . |
| . | . | . | . |

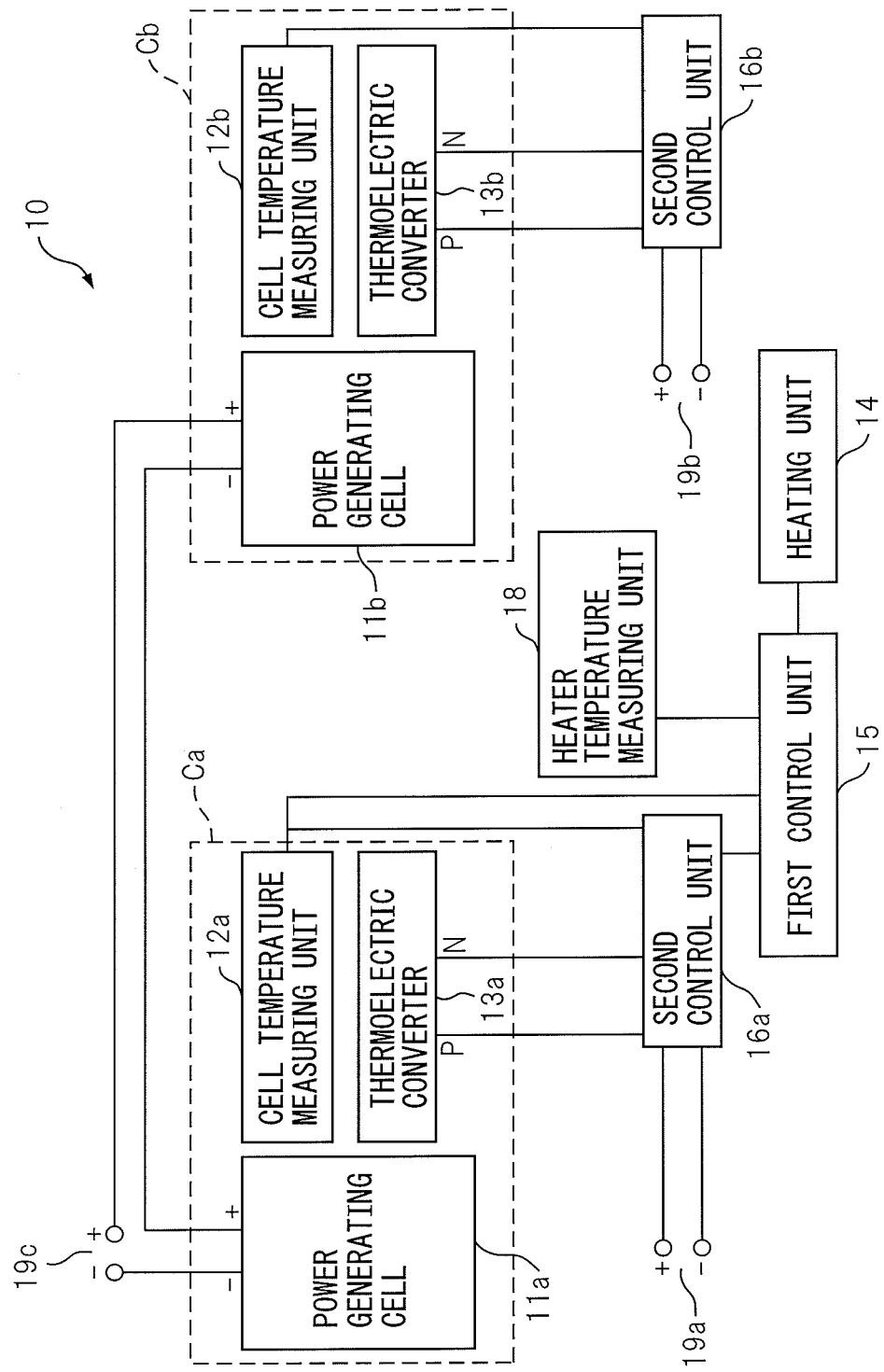

POWER GENERATING SYSTEM AND CONTROL METHOD FOR THE SAME

CROSS-REFERENCE TO RELATED APPLICATIONS

This application is based upon and claims the benefit of priority of the prior Japanese Patent Application No. 2009-289540, filed on Dec. 21, 2009, the entire contents of which are incorporated herein by reference.

FIELD

The present invention relates to a power generating system and a control method for the same.

BACKGROUND

Power generating systems using fuel cells for the practical uses have been studied for several ten years. The operating temperature of a fuel cell is determined primarily by the temperature at which ionic conduction occurs in the electrolyte layer. Among others, a fuel cell using a solid oxide electrolyte has a high operating temperature and may achieve high power generating efficiency.

A fuel cell battery is constructed by connecting many power generating cells in series or in parallel. Since variations in power generating characteristics exist among the individual power generating cells, when generating power by connecting many power generating cells the operating temperature for power generation is set for each power generating cell in order to stably operate each power generating cell at its optimum power output. Therefore, in a fuel cell battery, it is desired to control the temperature of each power generating cell.

Further, the operating temperature of the type of fuel cell that uses a solid oxide electrolyte is as high as, for example, 500° C. to 1000° C. When operating the fuel cell at rest, it is desired to reduce the time necessary for the fuel cell to reach its operating temperature after it has been started up.

There is therefore a need to quickly raise the temperature of each power generating cell of the fuel cell battery or to individually control the temperature of each power generating cell.

In the power generating operation of the fuel cell that uses an exothermic reaction, it is also desirable to effectively utilize the thermal energy produced during the power generation.

In a large-scale fuel cell system, the thermal energy produced during the power generation may be effectively utilized, for example, by using the energy to heat water and thus use it as hot water or to operate a generator using a mechanical thermal engine such as a turbine as a means for converting the energy to electric energy. However, since such mechanical means have many mechanical moving parts, the structure is complex and maintenance is not easy, and in the case of a small-scale fuel cell system, using mechanical means such as a turbine may not be suitable.

Japanese Laid-open Patent Publication No. 2005-228523
Japanese Laid-open Patent Publication No. 2007-200710

SUMMARY

This specification discloses a power generating system and a control method for the same.

According to an aspect of the embodiment, there is disclosed a control method for a power generating system which includes: a plurality of cells forming a fuel cell battery for generating power; a cell temperature measuring unit, provided for each of the cells, for measuring temperature of a corresponding one of the cells; a thermoelectric converter provided for each of the cells and having a thermal transfer mode and a thermal power generation mode; a heating unit which heats the plurality of cells; a first control unit which controls the heating unit; and a second control unit, provided for each of the thermoelectric converters, for controlling a corresponding one of the thermoelectric converters, and wherein: the first control unit controls the heating unit so as to bring the temperature of the heating unit to within a predetermined control temperature range, and the second control unit performs control so that if the temperature of the corresponding cell lies outside a predetermined operating temperature range, the thermoelectric converter is switched to the thermal transfer mode and is controlled so as to bring the temperature of the corresponding cell to within the predetermined operating temperature range and, if the temperature of the corresponding cell lies within the predetermined operating temperature range, the thermoelectric converter is switched to the thermal power generation mode.

According to an aspect of the embodiment, there is disclosed a power generating system which includes: a plurality of cells forming a fuel cell battery for generating power; a cell temperature measuring unit, provided for each of the cells, for measuring temperature of a corresponding one of the cells; a thermoelectric converter provided for each of the cells and having a thermal transfer mode and a thermal power generation mode; a heating unit which heats the plurality of cells; a first control unit which controls the heating unit; and a second control unit, provided for each of the thermoelectric converters, for controlling a corresponding one of the thermoelectric converters, and wherein: the first control unit controls the heating unit so as to bring the temperature of the heating unit to within a predetermined control temperature range, and the second control unit performs control so that if the temperature of the corresponding cell lies outside a predetermined operating temperature range, the thermoelectric converter is switched to the thermal transfer mode and is controlled so as to bring the temperature of the corresponding cell to within the predetermined operating temperature range and, if the temperature of the corresponding cell lies within the predetermined operating temperature range, the thermoelectric converter is switched to the thermal power generation mode.

The object and advantages of the embodiments will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF DRAWINGS

FIG. 4A is a diagram illustrating a second control unit of FIG. 1.

FIG. 4B is a diagram illustrating a table maintained in a first control unit of FIG. 1.

FIG. 14 is a block diagram illustrating a third embodiment of a power generating system disclosed in this specification.

DESCRIPTION OF EMBODIMENTS

[a] First Embodiment

A first preferred embodiment of a power generating system disclosed in this specification will be described below with reference to drawings. However, it should be noted that the technical scope of the present invention is not limited to the specific embodiments disclosed herein, but extends to the inventions described in the appended claims and their equivalents.

Figure 1:
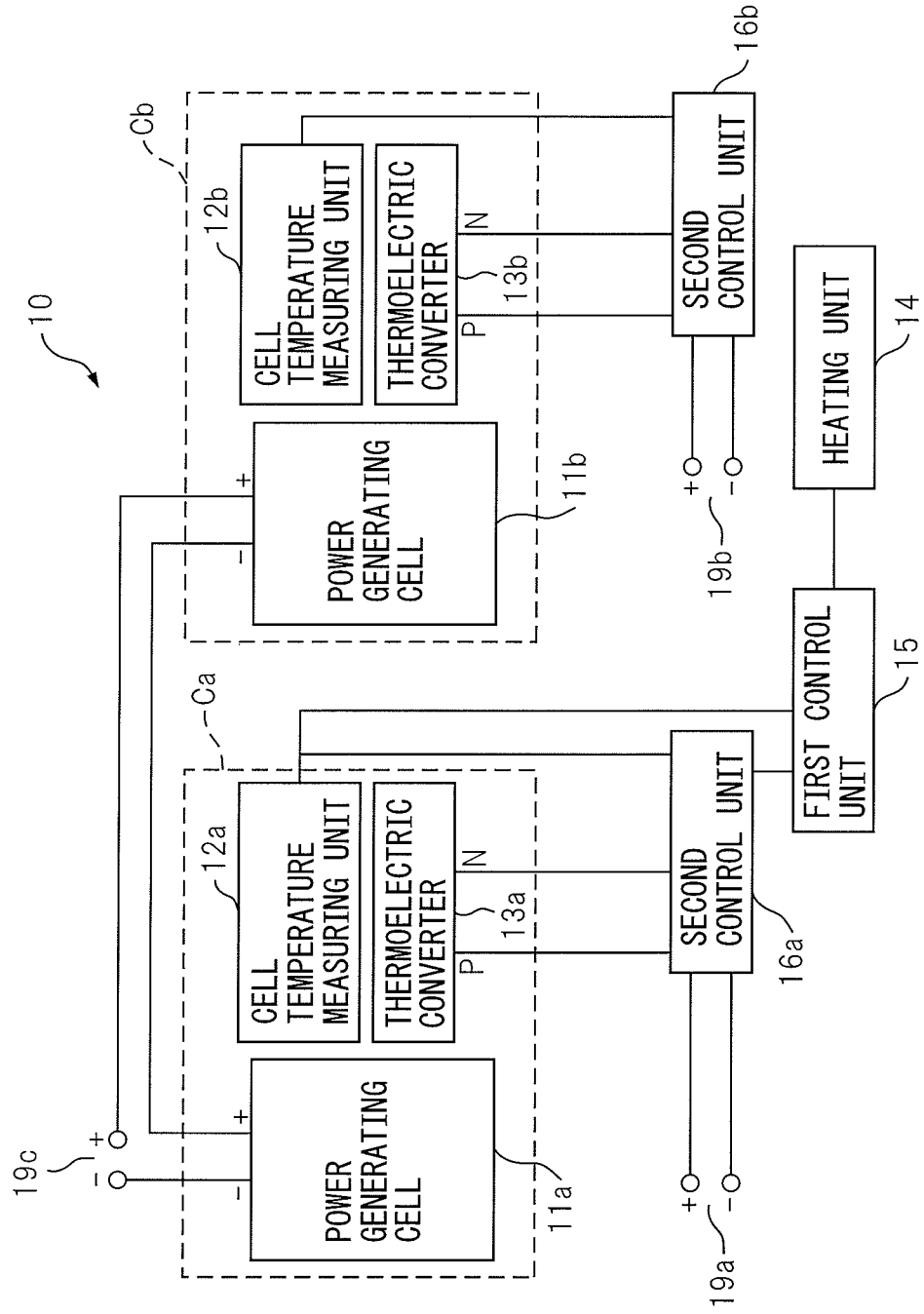
FIG. 1 is a block diagram illustrating a first embodiment of a power generating system disclosed in this specification.
Figure 2:
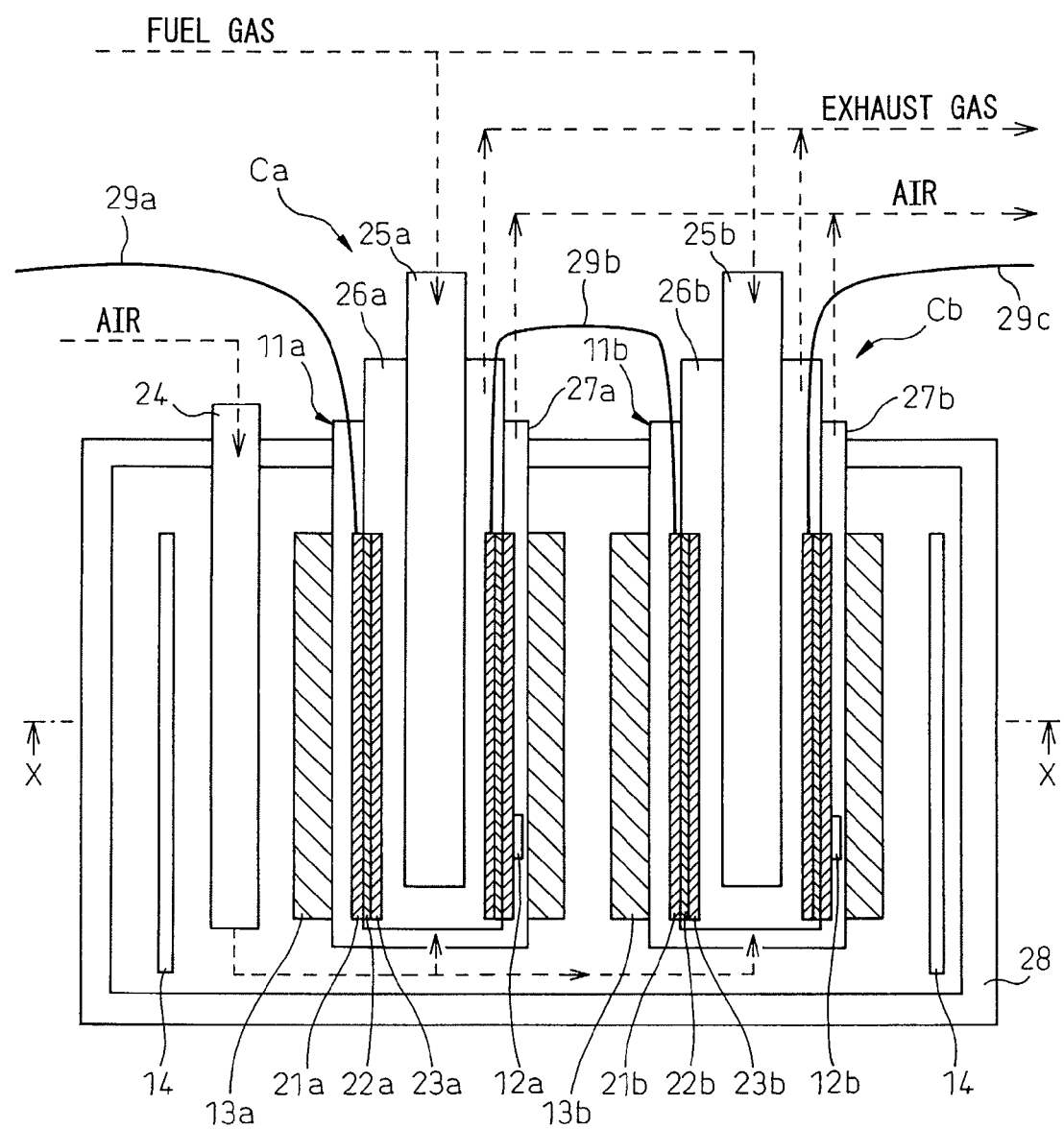
FIG. 2 is a diagram illustrating the essential portions of the power generating system of FIG. 1.
Figure 3:
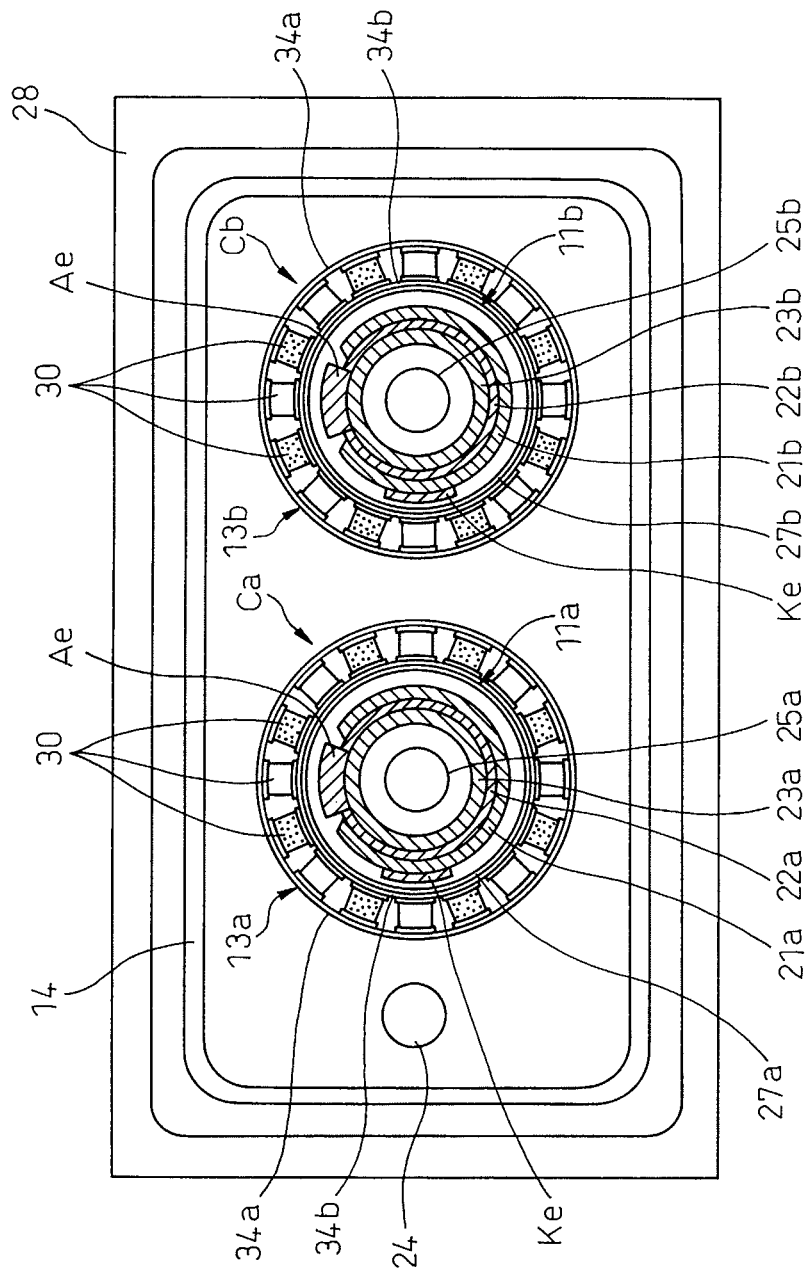
FIG. 3 is a cross-sectional view taken along line X-X in FIG. 2.

FIG. 1 is a block diagram illustrating the first embodiment of the power generating system disclosed in this specification. FIG. 2 is a diagram illustrating the essential portions of the power generating system of FIG. 1. FIG. 3 is a cross-sectional view taken along line X-X in FIG. 2. FIG. 4A is a diagram illustrating a second control unit of FIG. 1. FIG. 4B is a diagram illustrating a table maintained in a first control unit of FIG. 1.

The power generating system 10 of this embodiment can include two power generating cells 11a and 11b forming a fuel cell battery, and two cell temperature measuring units 12a and 12b, provided for the respective power generating cells 11a and 11b, for measuring the temperatures of the power generating cells 11a and 11b, respectively. The cell temperature measuring units 12a and 12b can each be constructed, for example, from a thermocouple.

The power generating system 10 can further include thermoelectric converters 13a and 13b for the respective power generating cells 11a and 11b. The thermoelectric converters 13a and 13b each have a thermal transfer mode for heating or cooling the corresponding power generating cell 11a or 11b and a thermal power generation mode for generating power by receiving thermal energy from the corresponding power generating cell 11a or 11b.

In the thermal transfer mode, the thermoelectric converters 13a and 13b each function as a Peltier element to transfer heat. The thermoelectric converters 13a and 13b each have a cell side which faces the corresponding power generating cell, and a heater side which faces a heating unit 14 located on the side opposite from the cell side. In the thermal transfer mode, power is supplied to the thermoelectric converter which then transfers heat between the cell side and the heater side.

On the other hand, in the thermal power generation mode, the thermoelectric converters 13a and 13b each function as a Seebeck element and generate power by utilizing the temperature difference arising between the cell side heated by the corresponding power generating cell and the heater side whose temperature is lower than that of the cell side.

In addition to the heating unit 14 which heats the two power generating cells 11a and 11b, the power generating system 10 can include a first control unit 15 which controls the heating unit 14 based on the temperature of the heating unit 14.

The power generating system 10 can further include second control units 16a and 16b, provided for the respective thermoelectric converters 13a and 13b, for controlling the thermoelectric converters 13a and 13b, respectively. The second control unit 16a sets the thermoelectric converter 13a into the thermal transfer mode or into the thermal power generation mode, based on the temperature of the power generating cell 11a measured by the cell temperature measuring unit 12a. Likewise, the second control unit 16b sets the thermoelectric converter 13b into the thermal transfer mode or into the thermal power generation mode, based on the temperature of the power generating cell 11b measured by the cell temperature measuring unit 12b.

In the power generating system 10, the first control unit 15 controls the heating unit 14, while the second control units 16a and 16b control the respective thermoelectric converters 13a and 13b and thereby control the temperatures of the respective power generating cells 11a and 11b.

The power generating system 10 can further include a power terminal 19a at which the power generated by the thermoelectric converter 13a is taken, a power terminal 19b at which the power generated by the thermoelectric converter 13b is taken, and a power terminal 19c at which the power generated by the two power generating cells 11a and 11b is taken.

Thus, the power generating system 10 can include a first cell assembly Ca containing the power generating cell 11a, cell temperature measuring unit 12a, and thermoelectric converter 13a described above, and a second cell assembly Cb containing the power generating cell 11b, cell temperature measuring unit 12b, and thermoelectric converter 13b.

In the power generating system 10, since there is a difference in power generating characteristics between the two power generating cells 11a and 11b, when generating power using the two power generating cells simultaneously, it is preferable to set and control the power generation operating temperature for each individual power generating cell in order to stably operate each power generating cell at its optimum power output. The power generation operating temperature here may be defined as a range of temperatures, as will be described later.

More specifically, in the power generating system 10, the entire structure of the two power generating cells 11a and 11b is heated by using the first control unit 15 and the heating unit 14. Furthermore, in the power generating system 10, the temperatures of the two power generating cells 11a and 11b are controlled individually by using the second control units 16a and 16b.

In the first cell assembly Ca, the second control unit 16a controls the temperature of the power generating cell 11a by using the cell temperature measuring unit 12a and the thermoelectric converter 13a. Similarly, in the second cell assembly Cb, the second control unit 16b controls the temperature of the power generating cell 11b by using the cell temperature measuring unit 12b and the thermoelectric converter 13b.

Next, the second control unit 16a that controls the first cell assembly Ca will be described below with reference to FIG. 4A.

The second control unit 16a can include two drive amplifiers 41a and 41b for supplying power to the thermoelectric converter 13a in the thermal transfer mode, and the power terminal 19a at which the power generated by the thermoelectric converter 13a in the thermal power generation mode is taken. The second control unit 16a can further include switches 42a and 42b having two circuits and two contacts and switches 43a and 43b also having two circuits and two contacts. Further, the second control unit 16a can include an operational unit 40 which takes as input the temperature of the power generating cell 11a from the cell temperature measuring unit 12a and controls the two drive amplifiers 41a and 41b, the switches 42a and 42b, and the switches 43a and 43b.

The switches 42a and 42b supplied with a signal from the operational unit 40 operate to open or close the contacts in a synchronized fashion. Similarly, the switches 43a and 43b supplied with a signal from the operational unit 40 operate to open or close the contacts in a synchronized fashion. Switching devices such as transistors or relays or the like can be used as the switches 42a, 42b, 43a, and 43b.

One terminal of the switch 42a is electrically connected to one terminal of the switch 43a, and these terminals are connected in common to an N-side electrode of the thermoelectric converter 13a. Further, one terminal of the switch 42b is electrically connected to one terminal of the switch 43b, and these terminals are connected in common to a P-side electrode of the thermoelectric converter 13a.

The other terminal of the switch 42a is connected to the output terminal of the drive amplifier 41a. The other terminal of the switch 42b is connected to the output terminal of the drive amplifier 41b. The other terminal of the switch 43a is connected to the power terminal 19a. The other terminal of the switch 43b is connected to the power terminal 19a.

In the second control unit 16a that controls the first cell assembly Ca, the other terminal of the switch 43a is also connected to the operational unit 40. The other terminal of the switch 43b is also connected to the operational unit 40. The power being generated by the thermal power generation operation of the thermoelectric converter 13a is supplied via the switches 43a and 43b to the operational unit 40, which measures the voltage and current generated by the thermal power generation operation of the thermoelectric converter 13a. The operational unit 40 supplies the measured values of the voltage and current to the first control unit 15.

In the power generating system 10 of this embodiment, the second control unit 16b that controls the second cell assembly Cb does not have the function of measuring the voltage and current generated by the thermoelectric converter 13b. Otherwise, the second control unit 16b is identical in function and configuration to the second control unit 16a; therefore, the above description given of the second control unit 16a also applies essentially to the second control unit 16b. However, like the second control unit 16a that controls the first cell assembly Ca, the second control unit 16b that controls the second cell assembly Cb may be configured to have the function of measuring the voltage and current generated by the thermoelectric converter 13b.

The output signal to the drive amplifier 41a from the operational unit 40 is supplied to the non-inverting input terminal of the drive amplifier 41a. The inverting input terminal of the drive amplifier 41a is connected to ground. On the other hand, the output signal to the drive amplifier 41b from the operational unit 40 is supplied to the inverting input terminal of the drive amplifier 41b. The non-inverting input terminal of the drive amplifier 41b is connected to ground.

The two drive amplifiers 41a and 41b supplied with the signals output from the operational unit 40 supply power to the thermoelectric converter 13a via the respective switches 42a and 42b. By controlling the output signals to the two drive amplifiers 41a and 41b, the operational unit 40 can reverse the direction of the electric current that is supplied to the thermoelectric converter 13a. The thermoelectric converter 13a heats or cools the power generating cell 11a, depending on in which direction the electric current flows.

The operational unit 40 takes as input the temperature of the power generating cell 11a from the cell temperature measuring unit 12a and, based on the temperature of the power generating cell 11a, sets the thermoelectric converter 13a into the thermal transfer mode or into the thermal power generation mode. In the present embodiment, the cell temperature measuring unit 12a is a two-wire temperature sensor, whose two sensing lines are connected to the operational unit 40.

In the thermal transfer mode, the operational unit 40 causes the switches 43a and 43b to open and the switches 42a and 42b to close so that power is supplied from the two drive amplifiers 41a and 41b to the thermoelectric converter 13a.

The power generating cell 11a has a power generation operating temperature Topa, and in the thermal transfer mode, the operational unit 40 in the second control unit 16a controls the corresponding thermoelectric converter 13a so that the temperature of the power generating cell 11a under control becomes identical to the power generation operating temperature Topa. Similarly, the power generating cell 11b has a power generation operating temperature Topb, and in the thermal transfer mode, the second control unit 16b controls the corresponding thermoelectric converter 13b so that the temperature of the power generating cell 11b under control becomes identical to the power generation operating temperature Topb.

For example, PID control can be used as the method of controlling the temperature of the thermoelectric converter 13a by the operational unit 40.

On the other hand, in the thermal power generation mode, the operational unit 40 causes the switches 42a and 42b to open and the switches 43a and 43b to close so that the power generated by the thermoelectric converter 13a is output at the power terminal 19a.

The operational unit 40 can be constructed using a CPU, a storage unit, an input/output unit, an A/D converter, etc. More specifically, the operational unit 40 can be constructed using a microprocessor, a microcontroller, a personal computer, or a programmable controller or the like.

Next, the heating unit 14 will be described below with reference to FIGS. 2 and 3.

The heating unit 14 is arranged in a hermetically sealed insulating reactor 28 in such a manner as to encircle the first and second cell assemblies Ca and Cb. The heating unit 14 heats the power generating cells 11a and 11b contained in the respective cell assemblies.

The heating unit 14 can have the capability to heat the power generating cells 11a and 11b up to the temperature at which the electrolyte in each of the power generating cells 11a and 11b exhibits good ionic conductivity.

Next, the first control unit 15 will be described below.

The first control unit 15 stores a control temperature range Tcon for the heating unit 14, and can heat the heating unit 14 in a controlled manner toward the control temperature range Tcon if the temperature of the heating unit 14 is lower than the control temperature range Tcon.

Then, in the power generating system 10, while the first control unit 15 controls the heating unit 14, the second control units 16a and 16b can control the respective thermoelectric converters 13a and 13b and thereby control the temperatures of the respective power generating cells 11a and 11b.

For example, PID control can be used as the method of controlling the temperature of the heating unit 14 by the first control unit 15.

The first control unit 15 can be constructed using a CPU, a storage unit, an input/output unit, an A/D converter, etc. More specifically, the first control unit 15 can be constructed using a microprocessor, a microcontroller, a personal computer, or a programmable controller or the like.

In the power generating system 10, the first control unit 15 can obtain the temperature of the heating unit 14 in the following manner.

The first control unit 15 maintains a table T that indicates, as illustrated in FIG. 4B, the relationships between the temperature of the power generating cell 11a in the first cell assembly Ca, the values of the voltage and current generated by the thermoelectric converter 13a, and the temperature measured at the heater side of the thermoelectric converter 13a. The first control unit 15 obtains the temperature of the heating unit 14 by using the table T, the temperature of the power generating cell 11a measured by the cell temperature measuring unit 12a, and the values of the voltage and current generated by the thermoelectric converter 13a.

The table T is obtained, for example, in the following manner.

First, a temperature sensor is attached to the heater side of the thermoelectric converter 13a. This temperature sensor measures the temperature at the heater side of the thermoelectric converter 13a. Next, a rod-like heater is inserted inside the power generating cell 11a, for example, into a fuel inlet tube 25a to be described later.

Next, the power generating cell 11a is heated from inside by using the rod-like heater, and at least three different first temperature levels are set by measuring the temperature of the power generating cell 11a within a predetermined temperature range by using the cell temperature measuring unit 12a. Each temperature thus measured using the cell temperature measuring unit 12a is called the first temperature level. It is preferable to set each first temperature level so as to lie within the temperature range that the power generating cell 11a can take during the operation of the power generating system 10. The first temperature levels are set, for example, at increments of 10° C. in the temperature range of 20° C. to 700° C.

Next, at each first temperature level, the power generating cell 11a is heated by the heating unit 14 and the temperature at the heater side of the thermoelectric converter 13a is measured by the temperature sensor. The temperature thus measured at the heater side of the thermoelectric converter 13a by using the temperature sensor is called the second temperature level. It is preferable to set the second temperature level so as to lie within the temperature range that the heating unit 14 can take during the operation of the power generating system 10. A temperature range smaller than the temperature range of the first temperature level by 0° C. to 300° C. can be taken as the temperature range of the second temperature level that the heating unit 14 can take. It is preferable to set this temperature range higher than the difference between the power generation operating temperature of the power generating cell 11a and that of the power generating cell 11b. The second temperature levels here can be set, for example, at increments of 10° C.

Next, at each second temperature level thus set for each first temperature level, a load resistor is connected to the thermoelectric converter 13a, and the thermoelectric converter 13a is operated in the thermal power generation mode; then, the voltage and current generated by the thermoelectric converter 13a are measured.

In this way, the table T is obtained that indicates the relationships between the temperature of the power generating cell 11a in the first cell assembly Ca, the temperature measured at the heater side of the thermoelectric converter 13a, and the values of the voltage and current generated by the thermoelectric converter 13a. The table T is stored in the first control unit 15. It is considered here that the temperature measured at the heater side of the thermoelectric converter 13a represents the temperature of the heating unit 14.

Accordingly, the first control unit 15 can obtain the temperature of the heating unit 14 by using the table T, the temperature of the power generating cell 11a measured by the cell temperature measuring unit 12a, and the values of the voltage and current generated by the thermoelectric converter 13a.

Next, the power generating cell 11a in the first cell assembly Ca will be described below with reference to FIGS. 2 and 3. Since the structure of the power generating cell 11b in the second cell assembly Cb is identical to that of the power generating cell 11a, the following description of the power generating cell 11a also applies essentially to the power generating cell 11b.

The power generating cell 11a includes a cylindrically shaped cathode electrode layer 21a, a cylindrically shaped electrolyte layer 22a disposed on the inside of the cathode electrode layer 21a, and a cylindrically shaped anode electrode layer 23a disposed on the inside of the electrolyte layer 22a. The cathode electrode layer 21a, the electrolyte layer 22a, and the anode electrode layer 23a are formed in the shape of a cylinder whose top and bottom are open. The inside diameter of the anode electrode layer 23a can be set in the range of 0.1 mm to 10 cm according to the power generation output and the purpose. The power generating cell 11b includes a cylindrically shaped cathode electrode layer 21b, a cylindrically shaped electrolyte layer 22b disposed on the inside of the cathode electrode layer 21b, and a cylindrically shaped anode electrode layer 23b disposed on the inside of the electrolyte layer 22b.

The power generating cell 11a further includes a cylindrically shaped air exhaust tube 27a disposed so as to be spaced outwardly from the cathode electrode layer 21a. The thermoelectric converter 13a which is of a cylindrical shape is mounted on the outside surface of the air exhaust tube 27a. The air exhaust tube 27a is formed in the shape of a cylinder whose top and bottom are open. The power generating cell 11b further includes a cylindrically shaped air exhaust tube 27b disposed so as to be spaced outwardly from the cathode electrode layer 21b. The thermoelectric converter 13b which is of a cylindrical shape is mounted on the outside surface of the air exhaust tube 27b. The air exhaust tube 27b is formed in the shape of a cylinder whose top and bottom are open.

The electrolyte layer 22a forms a portion of a lower part of a cylindrically shaped gas exhaust tube 26a. The gas exhaust tube 26a is formed in the shape of a cylinder having an open top and a closed bottom. Inside the gas exhaust tube 26a and spaced inwardly from it is disposed the fuel inlet tube 25a. The fuel inlet tube 25a is formed in the shape of a cylinder whose top and bottom are open. The electrolyte layer 22a forms a portion of a lower part of a cylindrically shaped gas exhaust tube 26a. The gas exhaust tube 26b is formed in the shape of a cylinder having an open top and a closed bottom. Inside the gas exhaust tube 26b and spaced inwardly from it is disposed the fuel inlet tube 25b. The fuel inlet tube 25b is formed in the shape of a cylinder whose top and bottom are open.

The cell temperature measuring unit 12a is mounted on the outside surface of the cathode electrode layer 21a.

A lead wire 29a for extracting the generated power is connected to the cathode electrode layer 21a via a cathode electrode terminal Ke. Further, a lead wire 29c for extracting the generated power is connected to the anode electrode layer 23b in the power generating cell 11b via an anode electrode terminal Ae. The anode electrode layer 23a in the power generating cell 11a and the cathode electrode layer 21b in the power generating cell 11b are connected together via an anode electrode terminal Ae, a lead wire 29b, and a cathode electrode terminal Ke.

When operating the power generating cell 11a to generate power, air is fed into the reactor 28 from outside through an air inlet tube 24. Oxygen may be used instead of air.

The air fed into the reactor 28 is introduced into the air exhaust tube 27a from the bottom thereof, passed between the inside surface of the air exhaust tube 27a and the outside surface of the cathode electrode layer 21a, and then exhausted to the exterior of the reactor 28.

On the other hand, a fuel gas is fed into the power generating cell 11a from outside the reactor 28 through the fuel inlet tube 25a. The fuel gas fed into the power generating cell 11a is passed between the fuel inlet tube 25a and the inside surface of the anode electrode layer 23a, and then exhausted as an exhaust gas to the exterior of the reactor 28 through the gas exhaust tube 26a. A compound containing $H_2$, CO, $CH_4$ or C and H can be used as the fuel gas.

The fuel inlet tube 26a, the gas exhaust tube 26a, and the air exhaust tube 27a can each be formed, for example, from ceramic, metal, or glass or the like. Specific examples include sintered aluminum nitride, sintered alumina, sintered SiC, SUS 304, SUS 316, Ni, silica glass, etc.

It is preferable from the standpoint of power generating efficiency to form the electrolyte layer 22a of the power generating cell 11a from a solid electrolyte, for example, and specifically, a solid oxide electrolyte. More specifically, partially stabilized zirconia (YSZ, etc.), stabilized zirconia (ScSZ), $LaGaO_3$, etc., can be used as the material for forming the electrolyte layer 22a.

The anode electrode layer 23a can be formed, for example, from a material such as a NiO—$CeO_2$ based material, a NiO—YSZ based material, or a NiO—ScZ based material. The cathode electrode layer 21a can be formed, for example, from a material such as La—Sr—Mn—O based material, a La—Co—$CeO_2$ based material, a Sm—Sr—Co—O based material, or a La—Sr—Co—O based material.

Figure 5:
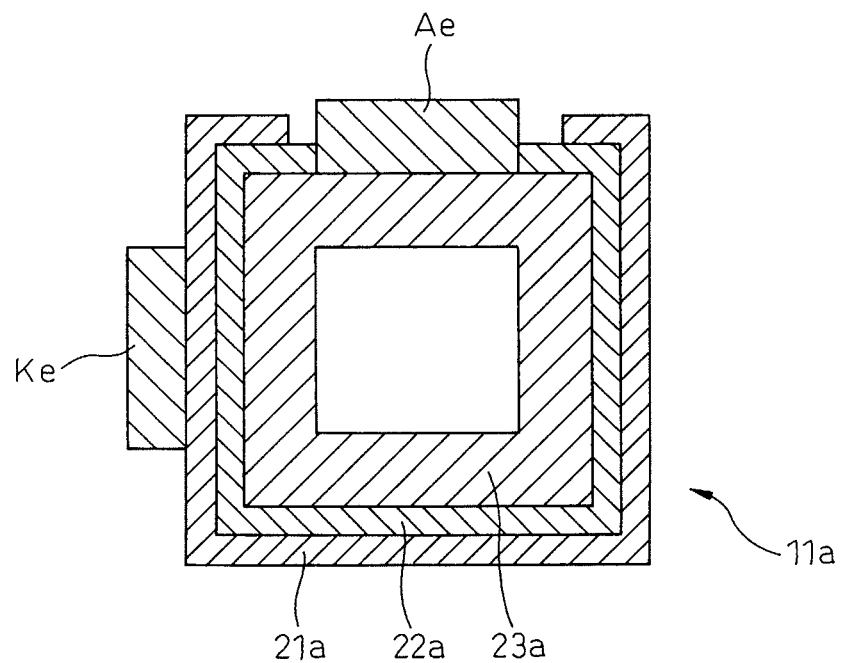
FIG. 5 is a diagram illustrating a modified example of a power generating cell of FIG. 3.

FIG. 5 illustrates a modified example of the power generating cell 11a. While the power generating cell 11a illustrated in FIG. 3 has a cylindrical cross section, the power generating cell 11a may be constructed to have a square cross section as depicted in FIG. 5. If the power generating cell 11a is formed in such a shape, the air exhaust tube 27a can also be formed in a square shape; as a result, the thermoelectric converter 13a having a planar shape can be easily mounted on the outside surface of the air exhaust tube 27a.

Next, the thermoelectric converter 13a in the first cell assembly Ca will be described below with reference to FIGS. 6 and 7. Since the structure of the thermoelectric converter 13b in the second cell assembly Cb is identical to that of the thermoelectric converter 13a, the following description of the thermoelectric converter 13a also applies essentially to the thermoelectric converter 13b.

Figure 6:
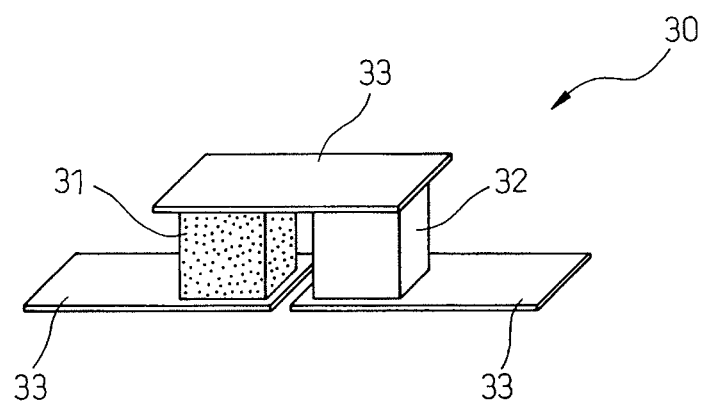
FIG. 6 is a perspective view illustrating an electrical connection structure of a thermoelectric converting element forming a thermoelectric converter in FIG. 3, the view being developed onto a flat plane for easy viewing of the curved structure.

FIG. 6 is a perspective view illustrating a thermoelectric converting element 30 forming the thermoelectric converter 13a in FIG. 3. FIG. 7 is a perspective view illustrating the thermoelectric converter 13a of FIG. 3.

The thermoelectric converter 13a is formed by connecting a plurality of thermoelectric converting elements 30. Each thermoelectric converting element 30 includes a p-type semiconductor device 31, an n-type semiconductor device 32, and electrodes 33 connecting the p-type semiconductor device 31 and the n-type semiconductor device 32 in series.

It is preferable to form the p-type semiconductor device or the n-type semiconductor device, for example, from an oxide having a perovskite structure, because it can then operate at high temperatures of about 500 to 800° C. Specific examples of oxides having a perovskite structure include an R—Co—O material, an R—Mn—O based material, and R—Ti—O based material (R: alkaline earth, alkaline metal). The R—Co—O based material includes, for example, $Ca_3Co_4O_9$. The R—Mn—O based material includes, for example, a Ca—La—Mn—O based material (such as $Ca_{1-x}La_xMnO_3$, X=0.1) or a Sr—La—Mn—O based material. The R—Ti—O based material includes, for example, $La_{0.1}Nb_{0.1}Sr_{0.8}TiO_3$.

The electrodes 33 can be formed, for example, from sheets such as Ag or Ni. The electrodes 33 are bonded to the semiconductor devices, for example, by applying or baking thereon an Ag paste or a paste produced by adding 10% by mass of Pd to Ag.

The number of thermoelectric converting elements 30 forming the thermoelectric converter 13a can be determined based on the design requirements (such as the operating temperature, the temperature difference in the thermoelectric converter 13a, the material used to form the semiconductor devices, the dimensions, and the fabrication process). For example, the number of thermoelectric converting elements 30 can be chosen to be 100 to 1000.

Figure 7:
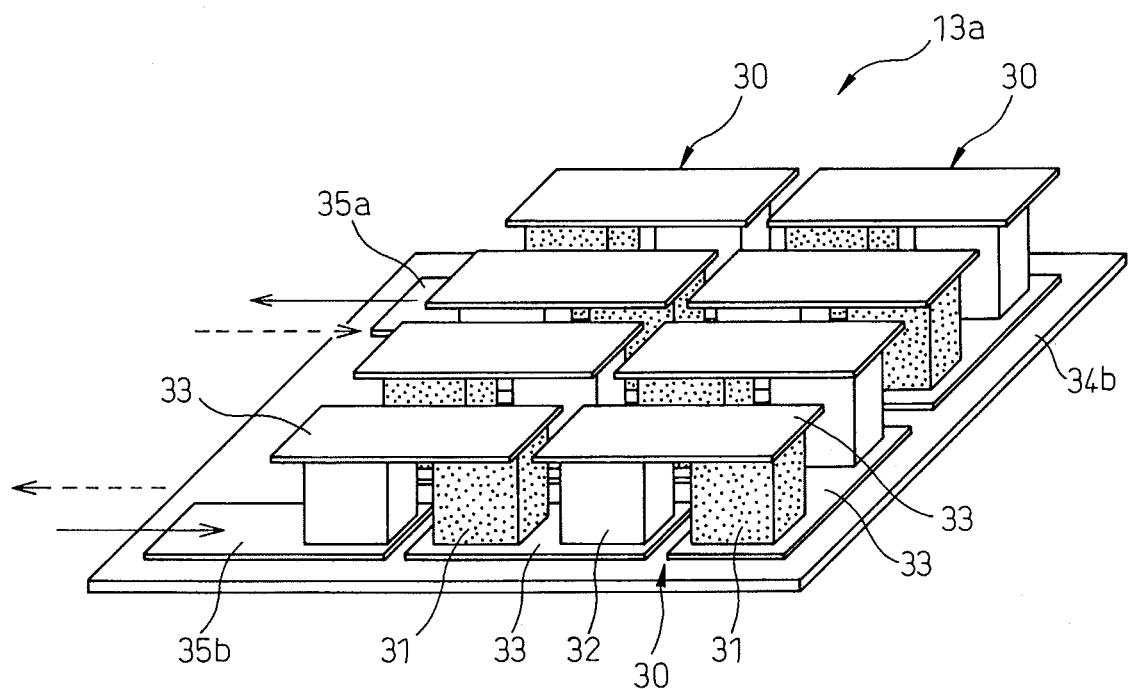
FIG. 7 is a perspective view illustrating the basic structure of the thermoelectric converter of FIG. 3, the view being developed onto a flat plane for easy viewing of the curved structure.

FIG. 7 illustrates one example of the thermoelectric converter formed by connecting eight thermoelectric converting elements 30 in series. The eight thermoelectric converting elements 30 are arranged on an electrically insulating substrate 34b. The electrodes arranged on the substrate 34b are formed, for example, by applying or baking on the substrate 34b an Ag paste or a paste produced by adding 10% by mass of Pd to Ag.

The power generated by the thermoelectric converter in the thermal power generation mode is extracted from power terminals 35a and 35b as indicated by solid arrows in FIG. 7. The power terminal 35a is connected to the p-type semiconductor device 31. The power terminal 35b is connected to the n-type semiconductor device 32. In the thermal transfer mode, the current is supplied in the direction indicated by dashed lines in FIG. 7.

In the power generating system 10 depicted in FIG. 3, the thermoelectric converter 13a is formed by placing an electrically insulating substrate 34a on top of the thermoelectric converting elements 30. The entire structure of the thermoelectric converter 13a depicted in FIG. 3 has a cylindrical shape whose top and bottom are open. The substrates 34a and 34b are formed in a concentric cylindrical fashion, and the p-type and n-type semiconductor devices 31 and 32 are sandwiched between the substrates 34a and 34b by interposing the electrodes 33 therebetween. The bottom substrate 34b is bonded to the outer surface of the air exhaust tube 27a of the power generating cell 11a.

When heating the power generating cell 11a in the thermal transfer mode, the thermoelectric converter 13a absorbs heat from the heater side and radiates the absorbed heat from the cell side toward the power generating cell 11a. On the other hand, when cooling the power generating cell 11a in the thermal transfer mode, the thermoelectric converter 13a absorbs heat from the cell side and dissipates the absorbed heat from the heater side.

In the thermoelectric converter 13a depicted in FIG. 3, the temperature at the cell side that faces the power generating cell 11a was set to 500° C., the temperature at the heater side that faces the heating unit 14 located on the side opposite from the cell side was set to 400° C., and 100 thermoelectric converting elements 30 connected in series were used. Further, $Ca_3Co_4O_9$ was used as the material for forming the p-type semiconductor devices, and $Ca_{1-x}La_xMnO_3$ (X=0.1) was used as the material for forming the n-type semiconductor devices. In this case, a voltage of about 2 V was obtained as the voltage generated by the thermoelectric converter 13a.

Figure 8:
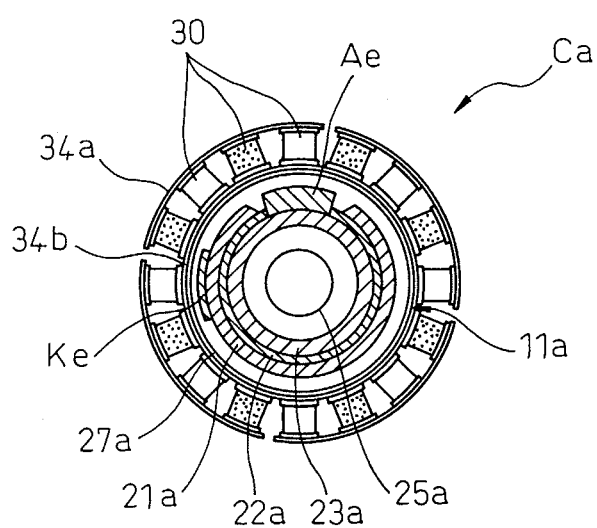
FIG. 8 is a diagram illustrating a modified example of the thermoelectric converter and power generating cell of FIG. 3.

FIG. 8 is a diagram illustrating a modified example of the thermoelectric converter of FIG. 3. In this modified example, slits extending in the direction of the generators of the cylindrical shape are formed in the top substrate 34a. Since the structure of the thermoelectric converter 13a having such a substrate 34a serves to alleviate thermal stress, durability to thermal fatigue improves. The structure also facilitates the formation of the substrate 34a.

Figure 9:
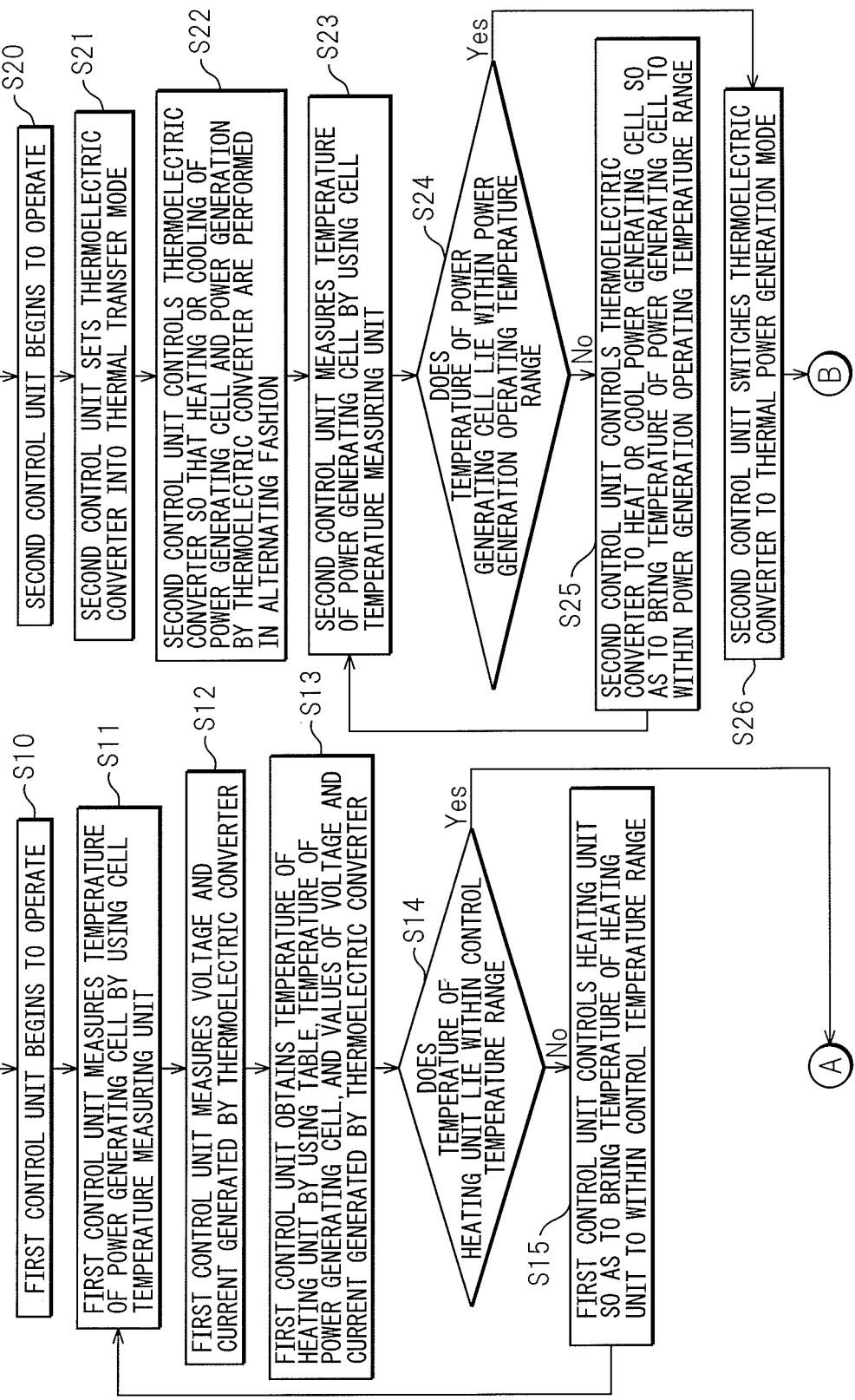
FIG. 9 is a flowchart illustrating the temperature control performed when starting up the power generating system of FIG. 1.
Figure 10:
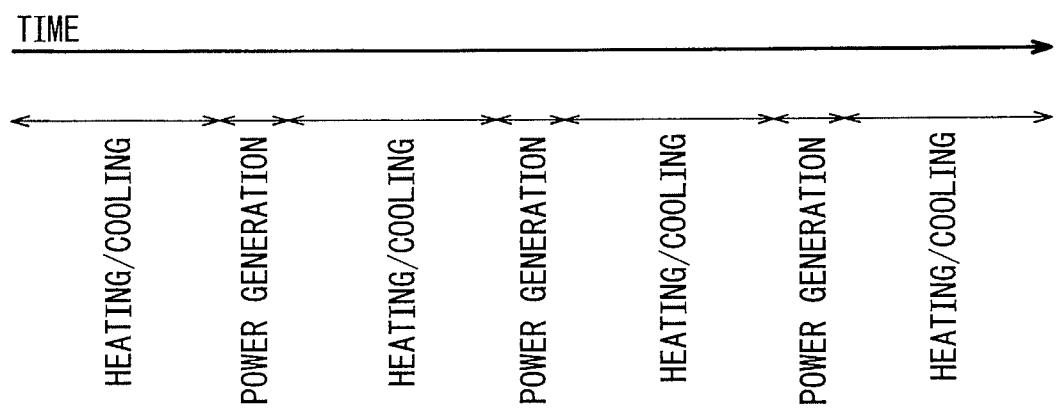
FIG. 10 is a diagram illustrating the operation of the thermoelectric converter in a thermal transfer mode.
Figure 11:
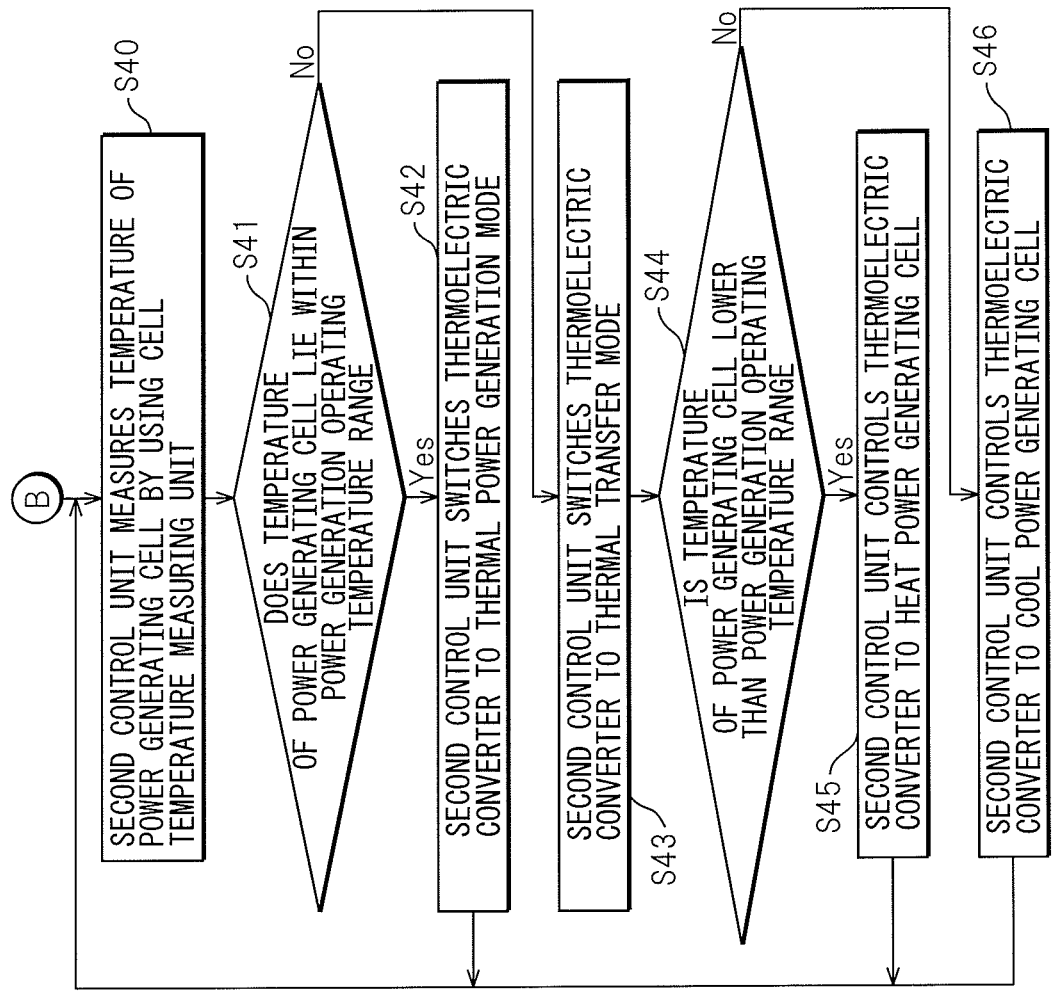
FIG. 11 is a flowchart illustrating the temperature control performed after the power generating system of FIG. 1 has been started up.

Next, the operation of the above-described power generating system 10 will be described below with reference to FIGS. 9 to 11. FIG. 9 is a flowchart illustrating the temperature control performed when starting up the power generating system of FIG. 1. FIG. 10 is a diagram illustrating the operation of the thermoelectric converter in the thermal transfer mode. FIG. 11 is a flowchart illustrating the temperature control performed after the power generating system of FIG. 1 has been started up.

First, the temperature control performed when starting up the power generating system 10 will be described below with reference to FIGS. 9 and 10.

The operation of the first control unit 15 during the startup of the generating system 10 will be described first.

As illustrated in FIG. 9, when the generating system 10 is started up, the first control unit 15 begins to operate in step S10. Air is introduced through the air inlet tube 24, and a fuel gas is introduced through the fuel inlet tubes 25a and 25b.

Next, in step S11, the first control unit 15 measures the temperature of the power generating cell 11a by using the cell temperature measuring unit 12a.

Next, in step S12, the first control unit 15 measures, through the use of the second control unit 16a, the voltage and current generated by the power generation operation of the thermoelectric converter 13a. When the thermoelectric converter 13a is in the thermal transfer mode, the first control unit 15 measures the voltage and current generated by the power generation operation that the thermoelectric converter 13a performs alternately with the heating or cooling operation, as will be described later. On the other hand, when the thermoelectric converter 13a is in the thermal generation mode, the first control unit 15 can at any time measure the voltage and current generated by the power generation operation of the thermoelectric converter 13a.

Next, in step S13, the first control unit 15 obtains the temperature Th of the heating unit 14 by using the table T, the temperature of the power generating cell 11a measured by the cell temperature measuring unit 12a, and the values of the voltage and current generated by the thermoelectric converter 13a. In the present embodiment, when obtaining the temperature Th of the heating unit 14, the first control unit 15 does not use the temperature of the power generating cell 11b in the second cell assembly Cb, nor does it use the values of the voltage and current generated by the thermoelectric converter 13b.

Next, in step S14, the first control unit 15 determines whether the temperature of the heating unit 14 lies within the control temperature range Tcon. If the temperature of the heating unit 14 lies within the control temperature range Tcon, the process proceeds to step S30 in FIG. 11. On the other hand, if the temperature of the heating unit 14 does not lie within the control temperature range Tcon, the process proceeds to step S15.

In step S15, the first control unit 15 controls the heating unit 14 so as to bring the temperature Th of the heating unit 14 to within the control temperature range Tcon. One example of how the heating unit 14 is controlled by the first control unit 15 will be described below.

It is assumed here that the power generation operating temperature Topa of the power generating cell 11a is 650° C. and the power generation operating temperature Topb of the power generating cell 11b is 600° C. The power generation operating temperature of the power generating cell having the highest power generation operating temperature is the power generation operating temperature Topa of the power generating cell 11a. On the other hand, the power generation operating temperature of the power generating cell having the lowest power generation operating temperature is the power generation operating temperature Topb of the power generating cell 11b. The difference Td between the highest power generation operating temperature and the lowest power generation operating temperature is 50° C. (=650° C.−600° C.)

The upper and lower limit values of the control temperature range Tcon for the heating unit 14 can be determined in the following manner. First, the lower limit value of the control temperature range Tcon is obtained by subtracting Td from the highest power generation operating temperature Topa. More specifically, the lower limit value of the control temperature range Tcon is calculated as Topa−Td=600° C. (=650° C.−50° C.). That is, the lower limit value of the control temperature range Tcon is the same as the lowest power generation operating temperature.

On the other hand, the upper limit value of the control temperature range Tcon for the heating unit 14 can be suitably set by considering safety, etc. For example, the upper limit value of the control temperature range Tcon for the heating unit 14 can be set equal to the power generation operating temperature of the power generating cell having the highest power generation operating temperature.

When starting up the power generating system 10, the first control unit 15 controls the heating unit 14 so that the temperature Th of the heating unit 14 obtained by using the table T becomes equal to or higher than the lower limit value of the control temperature range Tcon, more specifically, Topa−Td=600° C.

Then, the process returns to step S11.

The operation of the first control unit 15 during the startup of the generating system 10 has been described above. Next, the operation of the second control unit 16a during the startup of the generating system 10 will be described below.

First, in step S20, the second control unit 16a begins to operate.

Next, in step S21, the second control unit 16a sets the thermoelectric converter 12a in the first cell assembly Ca into the thermal transfer mode. In the thermal transfer mode, the second control unit 16a controls the corresponding thermoelectric converter 13a so that the temperature of the power generating cell 11a under control is maintained within the power generation operating temperature range to be described later.

Next, in step S22, the second control unit 16a controls the thermoelectric converter 13a in the thermal transfer mode so that heating or cooling of the power generating cell 11a and power generation by the thermoelectric converter 13a are performed in alternating fashion. Here, when starting up the power generating system 10, the thermoelectric converter 13a operates solely to heat the power generating cell 11a.

The thermoelectric converter 13a performs heating or cooling of the power generating cell 11a and power generation by the thermoelectric converter 13a in alternating fashion, as illustrated in FIG. 10. It is preferable that the duration of time that the power generation is performed is set to a length that does not affect the temperature of the power generating cell 11a. The duration of time that the power generation is performed can be determined based on such factors as the heat capacity, heat conductivity, specific heat, etc., of the power generating cell 11a. When causing the thermoelectric converter 13a to generate power, the operational unit 40 in the second control unit 16a turns on or off the respective switches 42a, 42b, 43a, and 43b appropriately. Then, in the earlier described step S12, the first control unit 15 obtains the temperature Th of the heating unit 14 by using the values of the voltage and current generated by the thermoelectric converter 13a.

Next, in step S23, the second control unit 16a measures the temperature Tca of the power generating cell 11a by using the cell temperature measuring unit 12a in the first cell assembly Ca.

Next, in step S24, the second control unit 16a determines whether the temperature Tca of the power generating cell 11a lies within the power generation operating temperature range. The power generation operating temperature Topa of the power generating cell 11a described above can be taken as the lower limit value of the power generation operating temperature range. The upper limit value of the power generation operating temperature range can be suitably set by considering safety, etc. For example, the upper limit value of the power generation operating temperature range can be set as Topa+100° C.

If the temperature Tca of the power generating cell 11a lies within the power generation operating temperature range, the process proceeds to step S26. On the other hand, if the temperature Tca of the power generating cell 11a does not lie within the power generation operating temperature range, the process proceeds to step S25.

In step S25, the second control unit 16a controls the thermoelectric converter 13a to heat or cool the power generating cell 11a so as to bring the temperature Tca of the power generating cell 11a to within the power generation operating temperature range. When starting up the power generating system 10, the thermoelectric converter 13a operates solely to heat the power generating cell 11a. More specifically, the second control unit 16a controls the thermoelectric converter 13a so that the temperature Tca of the power generating cell 11a reaches the lower limit value of the power generation operating temperature range, more specifically, the temperature Topa.

On the other hand, in step S26, the second control unit 16a causes the thermoelectric converter 13a in the first cell assembly Ca to switch to the thermal power generation mode, after which the process proceeds to step S40 in FIG. 11.

The temperature of the power generating cell 11b in the second cell assembly Cb is controlled by the second control unit 16b in a manner similar to that described above. However, since the first control unit 15 does not use the temperature of the power generating cell 11b when obtaining the temperature of the heating unit 15, the second control unit 16b controls the thermoelectric converter 13b to perform only the heating or cooling of the power generating cell 11b in the thermal transfer mode. Otherwise, the operation of the second control unit 16b is the same as that of the second control unit 16a; therefore, the above description given of the second control unit 16a also applies essentially to the second control unit 16b.

In this way, when starting up the power generating system 10, the first control unit 15 controls the heating unit 14 based on the temperature Th of the heating unit 14, while the second control units 16a and 16b control the respective thermoelectric converters 13a and 13b and thereby control the temperatures of the respective power generating cells 11a and 11b.

The above description has been given for the case where the first control unit 15 and the second control unit 16a operate simultaneously during the startup of the power generating system. Alternatively, only after the temperature of the heating unit 14 has reached the control temperature Tcon under the control of the first control unit 15, may the second control units 16a and 16b be operated to start the control of the respective thermoelectric converters 13a and 13b and thereby control the temperatures of the respective power generating cells 11a and 11b.

Next, the temperature control operation performed after the power generating system 10 has been started up will be described with reference to FIG. 11.

Steps S30 to S33 in FIG. 11 depict the process that the first control unit 15 performs after the power generating system 10 has been started up. The process from step S30 to step S33 is essentially the same as the process from step S11 to step S15 depicted in FIG. 9.

Next, the operation of the second control unit 16a after the power generating system 10 has been started up will be described below. Since the operation of the second control unit 16b is the same as that of the second control unit 16a, the following description of the second control unit 16a also applies essentially to the second control unit 16b.

First, in step S40, the second control unit 16a measures the temperature of the power generating cell 11a by using the cell temperature measuring unit 12a in the first cell assembly Ca.

Next, in step S41, the second control unit 16a determines whether the temperature Th of the power generating cell 11a in the first cell assembly Ca lies within the power generation operating temperature range. If the temperature Th of the power generating cell 11a lies within the power generation operating temperature range, the process proceeds to step S42. On the other hand, if the temperature Th of the power generating cell 11a does not lie within the power generation operating temperature range, the process proceeds to step S43.

In step S42, the second control unit 16a causes the thermoelectric converter 13a in the first cell assembly Ca to switch to the thermal power generation mode. The thermoelectric converter 13a converts the thermal energy received from the power generating cell 11a into electric energy. If the thermoelectric converter 13a is already in the thermal power generation mode, the mode switching is not performed. Then, the process returns to step S40.

On the other hand, in step S43, the second control unit 16a causes the thermoelectric converter 13a in the first cell assembly Ca to switch to the thermal transfer mode. If the thermoelectric converter 13a is already in the thermal transfer mode, the mode switching of the thermoelectric converter 13a is not performed.

Next, in step S44, the second control unit 16a determines whether the temperature Th of the power generating cell 11a is lower than the power generation operating temperature range. If the temperature Th of the power generating cell 11a is lower than the power generation operating temperature range, the process proceeds to step S45. On the other hand, if the temperature Th of the power generating cell 11a is not lower than the power generation operating temperature range, this means that the temperature Th of the power generating cell 11a is higher than the power generation operating temperature range, in which case the process proceeds to step S46.

In step S45, the second control unit 16a controls the thermoelectric converter 13a to heat the power generating cell 11a. Then, the process returns to step S40.

On the other hand, in step S46, the second control unit 16a controls the thermoelectric converter 13a to cool the power generating cell 11a. To cool the power generating cell 11a, the second control unit 16a reverses the direction of the current supplied to the thermoelectric converter 13a from the direction of the current supplied when heating. Then, the process returns to step S40.

In this way, in the temperature control after the power generating system 10 has been started up, the first control unit 15 controls the heating unit 14 based on the temperature Th of the heating unit 14. While the heating unit 14 is being controlled in this way, the second control units 16a and 16b control the temperatures of the respective power generating cells 11a and 11b by controlling the corresponding thermoelectric converters 13a and 13b.

According to the power generating system 10 of the embodiment described above, since heating is performed by using each individual thermoelectric converter while also using the heating unit, the temperature of each of the power generating cells forming the fuel cell battery can be quickly raised.

Furthermore, according to the power generating system 10, the temperature of each power generating cell can be controlled individually by using the corresponding thermoelectric converter. Accordingly, variations in reaction characteristics between the respective power generating cells can be corrected by adjusting the temperature of each individual power generating cell. In the power generating system 10, therefore, even when the difference between the operating temperatures of the respective power generating cells is as large as several tens of degrees centigrade, the battery startup time can be reduced and stable operation quickly achieved, and the temperature can be adjusted so as to maximize the power generation output. As a result, in a fuel cell battery that generates power by connecting a plurality of power generating cells, each power generating cell can be operated stably at its optimum power output.

According to the power generating system 10, the thermal energy produced during the power generation operation of the fuel cell battery can be converted into electric energy without using mechanical moving parts. This serves to increase the energy conversion efficiency of the power generating system. Moreover, elimination of the need for mechanical moving parts serves to enhance the maintainability or durability of the system.

Further, according to the power generating system 10, since the temperature of the heating unit can be obtained using the thermoelectric converter, there is no need to provide a separate measuring unit for measuring the temperature of the heating unit.

Next, power generating systems according to second and third embodiments disclosed in this specification will be described below with reference to drawings. The detailed description of the first embodiment given above essentially applies to those parts of the second and third embodiments that are not specifically described herein. Further, in FIGS. 12, 14, and 15, the same component elements as those in FIGS. 1 to 3 are designated by the same reference numerals.

[b] Second Embodiment

Figure 12:
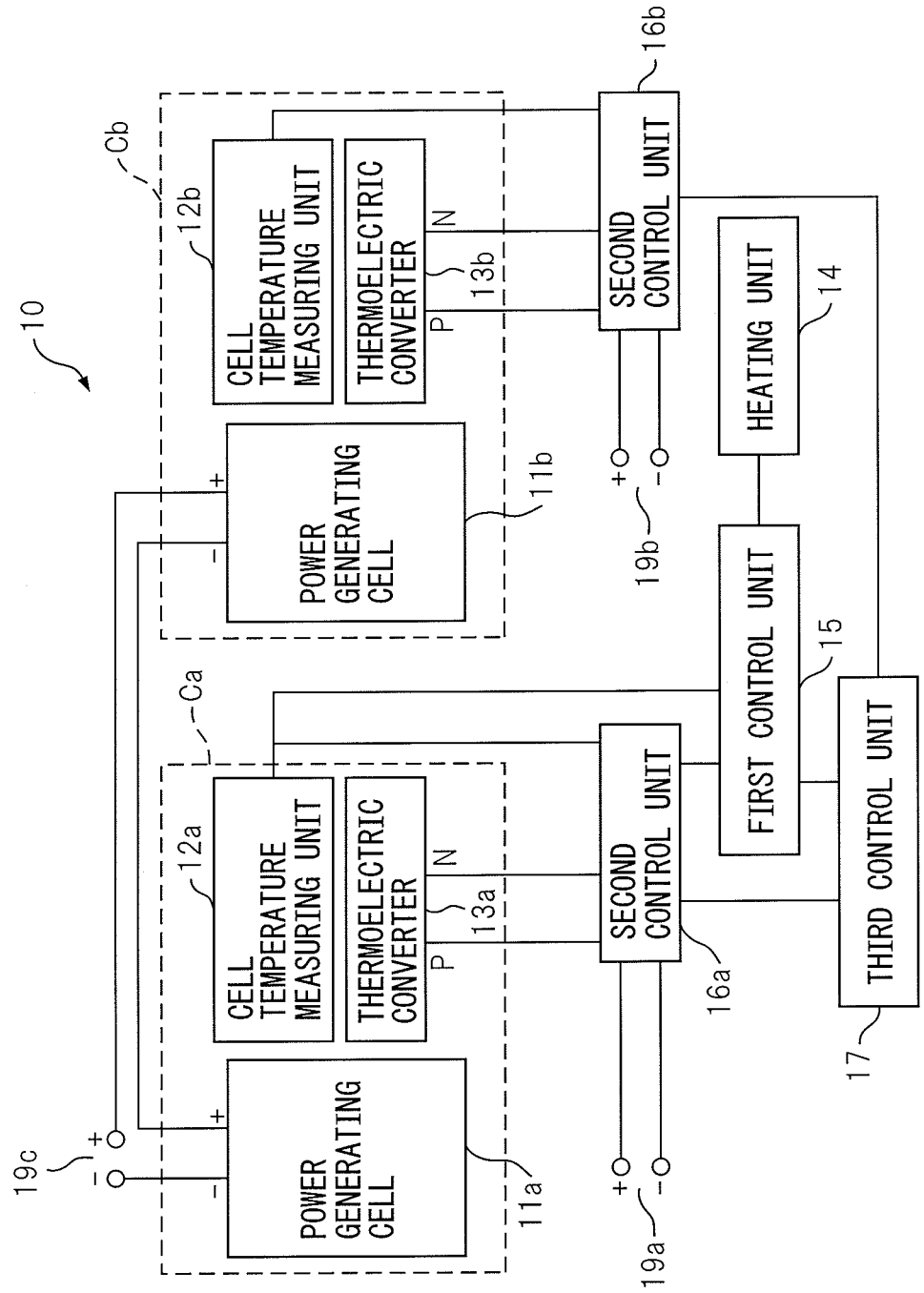
FIG. 12 is a block diagram illustrating a second embodiment of a power generating system disclosed in this specification.
Figure 13A:
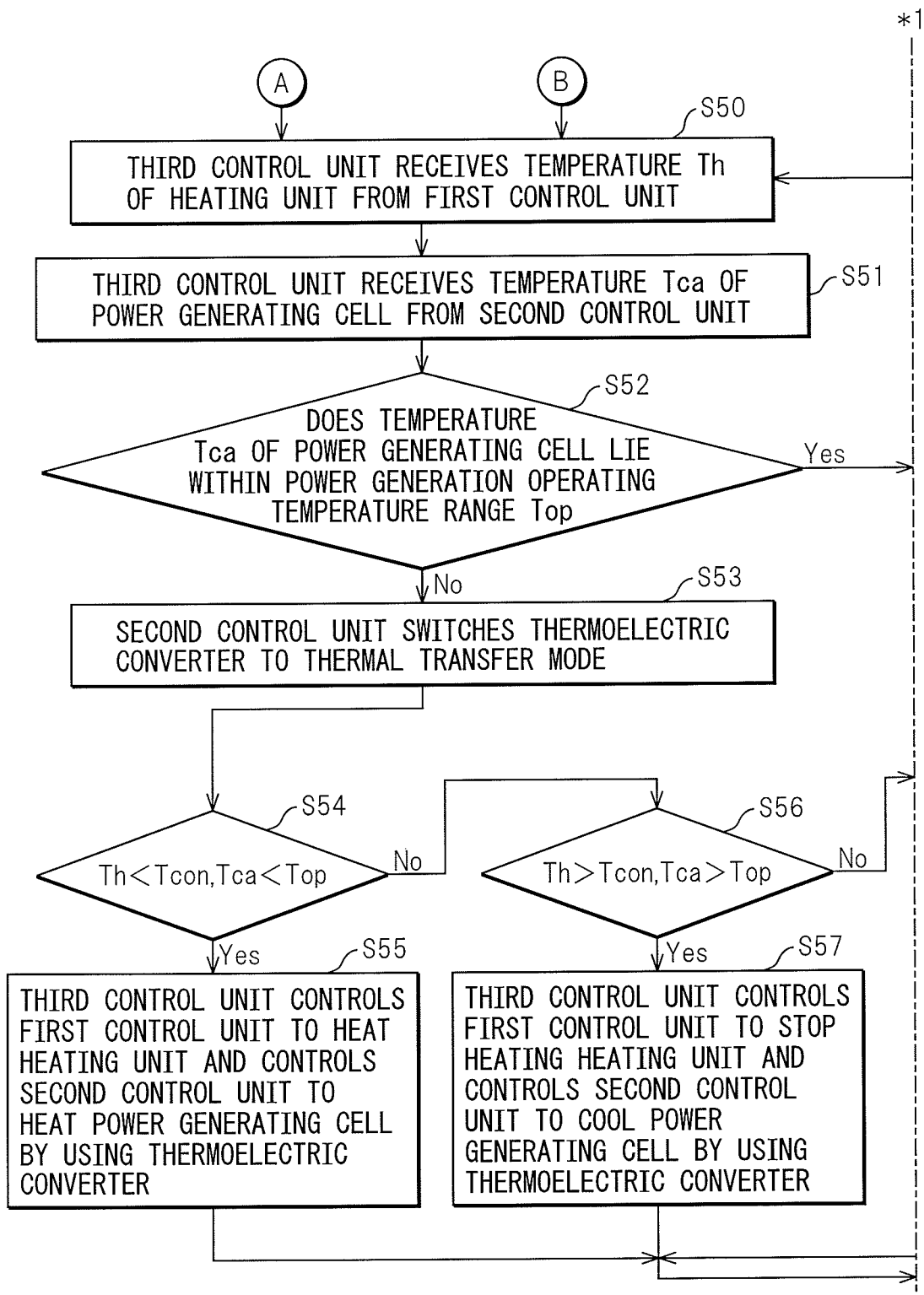
FIG. 13A is a flowchart (part 1) illustrating the temperature control performed in the power generating system of FIG. 12.
Figure 13B:
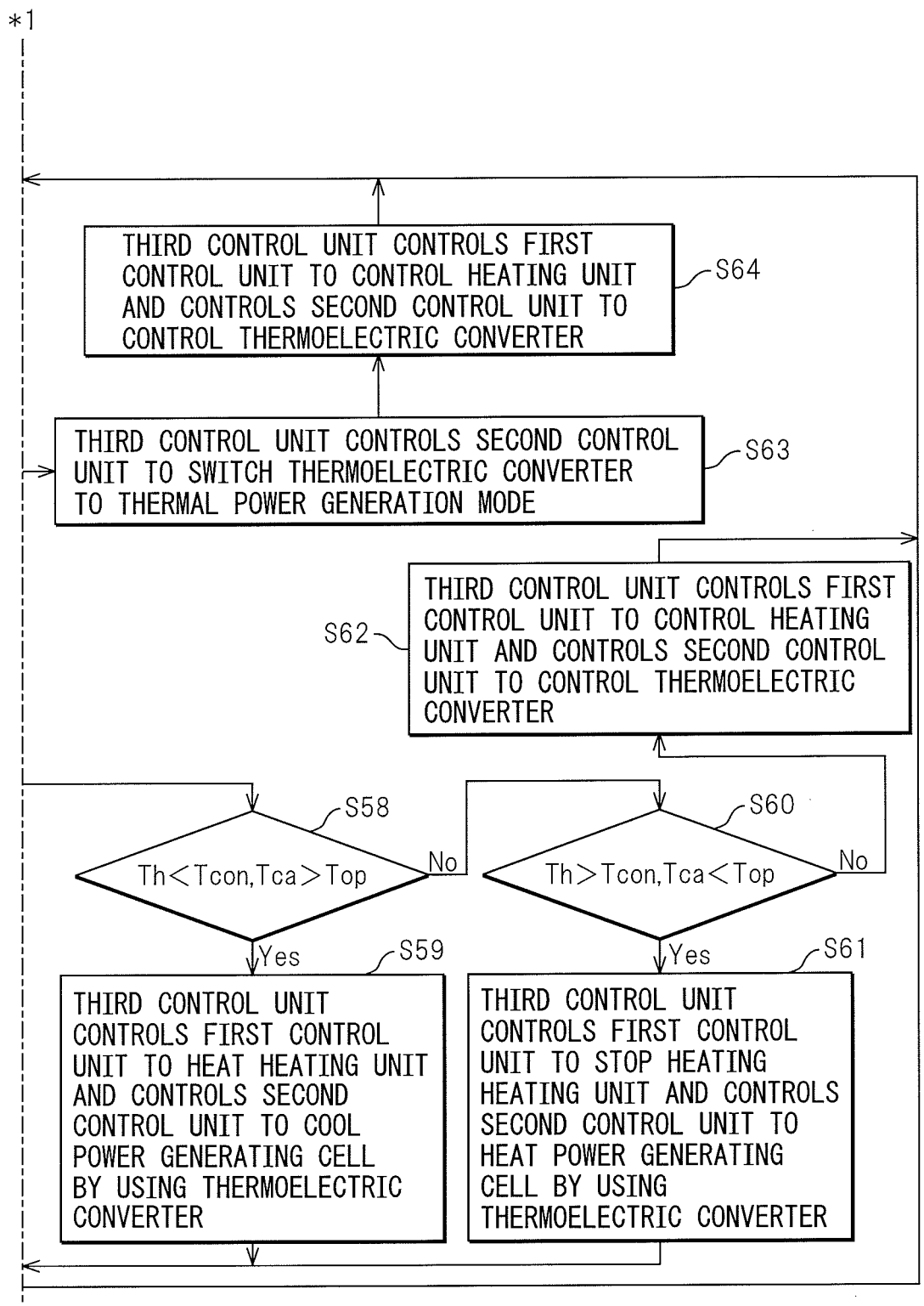
FIG. 13B is a flowchart (part 2) illustrating the temperature control performed in the power generating system of FIG. 12.

FIG. 12 is a block diagram illustrating the second embodiment of the power generating system disclosed in this specification. FIG. 13A is a flowchart (part 1) illustrating the temperature control performed in the power generating system of FIG. 12, and FIG. 13B is a flowchart (part 2) illustrating the temperature control performed in the power generating system of FIG. 12.

The power generating system 10 of this embodiment includes a third control unit 17 that controls the first control unit 15 and the two second control units 16a and 16b. The third control unit 17 controls the first control unit 15 and the second control units 16a and 16b, based on the temperature of the heating unit 14 and the temperature of the power generating cell 11a, respectively.

The third control unit 17 can be constructed using a CPU, a storage unit, an input/output unit, etc. More specifically, the third control unit 17 can be constructed using a microprocessor, a microcontroller, a personal computer, or a programmable controller or the like.

Otherwise, the configuration of the power generating system 10 of this embodiment is the same as that of the first embodiment.

Next, the temperature control operation performed after the power generating system 10 has been started up will be described with reference to FIGS. 13A and 13B.

First, after the power generating system 10 has been started up, the process proceeds to step S50. In step S50, the third control unit 17 receives the temperature Th of the heating unit 14 from the first control unit 15.

Next, in step S51, the third control unit 17 receives the temperature Tca of the power generating cell 11a from the second control unit 11a.

Next, in step S52, the third control unit 17 determines whether the temperature Tca of the power generating cell 11a lies within the power generation operating temperature range Top. The power generation operating temperature range Top refers to the range of temperatures bounded by the upper and lower limits of the power generation operating temperature. If the temperature Tca of the power generating cell 11a lies within the power generation operating temperature range Top, the process proceeds to step S63. On the other hand, if the temperature Tca of the power generating cell 11a does not lie within the power generation operating temperature range Top, the process proceeds to step S53.

The following describes the operation when the process has proceeded to step S53.

In step S53, the second control unit 16a switches the thermoelectric converter 13a to the thermal transfer mode. If the thermoelectric converter 13a is already in the thermal transfer mode, the mode switching is not performed.

Next, in step S54, the third control unit 17 determines whether the temperature Th of the heating unit 14 is lower than the control temperature range Tcon and the temperature Tca of the power generating cell 11a is also lower than the power generation operating temperature range Top of the power generating cell 11a. If this condition is satisfied, the process proceeds to step S55. On the other hand, if this condition is not satisfied, the process proceeds to step S56.

In step S55, the third control unit 17 controls the first control unit 15 to heat the heating unit 14 and controls the second control unit 16a to heat the power generating cell 11a by using the thermoelectric converter 13a. Then, the process returns to step S50. On the other hand, in step S56, the third control unit 17 determines whether the temperature Th of the heating unit 14 is higher than the control temperature range Tcon and the temperature Tca of the power generating cell 11a is also higher than the power generation operating temperature range Top of the power generating cell 11a. If this condition is satisfied, the process proceeds to step S57. On the other hand, if this condition is not satisfied, the process proceeds to step S58.

In step S57, the third control unit 17 controls the first control unit 15 to stop heating the heating unit 14 and controls the second control unit 16a to cool the power generating cell 11a by using the thermoelectric converter 13a. Then, the process returns to step S50.

On the other hand, in step S58, the third control unit 17 determines whether the temperature Th of the heating unit 14 is lower than the control temperature range Tcon but the temperature Tca of the power generating cell 11a is higher than the power generation operating temperature range Top of the power generating cell 11a. If this condition is satisfied, the process proceeds to step S59. On the other hand, if this condition is not satisfied, the process proceeds to step S60.

In step S59, the third control unit 17 controls the first control unit 15 to heat the heating unit 14 and controls the second control unit 16a to cool the power generating cell 11a by using the thermoelectric converter 13a. Then, the process returns to step S50.

On the other hand, in step S60, the third control unit 17 determines whether the temperature Th of the heating unit 14 is higher than the control temperature range Tcon but the temperature Tca of the power generating cell 11a is lower than the power generation operating temperature range Top of the power generating cell 11a. If this condition is satisfied, the process proceeds to step S61. On the other hand, if this condition is not satisfied, the process proceeds to step S62.

In step S61, the third control unit 17 controls the first control unit 15 to stop heating the heating unit 14 and controls the second control unit 16a to heat the power generating cell 11a by using the thermoelectric converter 13a. Then, the process returns to step S50.

On the other hand, if the process has proceeded to step S62, this means that the temperature Th of the heating unit 14 lies within the control temperature range Tcon; therefore, the third control unit 17 controls the first control unit 15 to control the heating unit 14 and controls the second control unit 16a to control the thermoelectric converter 13a. The operation of the first control unit 15 and the second control unit 16a is the same as that depicted in FIG. 11. Then, the process returns to step S50.

Next, the operation will be described below when the process has proceeded from step S52 to step S63.

In step S63, the third control unit 17 controls the second control unit 16a to switch the thermoelectric converter 13a to the thermal power generation mode. If the thermoelectric converter 13a is already in the thermal power generation mode, the mode switching is not performed.

Next, in step S64, the third control unit 17 controls the first control unit 15 to control the heating unit 14 and controls the second control unit 16a to control the thermoelectric converter 13a. The operation of the first control unit 15 and the second control unit 16a is the same as that depicted in FIG. 11. Then, the process returns to step S50.

While the above description has dealt with the operation of the second control unit 16a in the first cell assembly Ca, the same description applies to the operation of the second control unit 16b in the second cell assembly Cb. That is, the temperature of the power generating cell 11b in the second cell assembly Cb may be controlled simultaneously by the third control unit 17 and the second control unit 16b.

According to the power generating system of the embodiment described above, the temperatures of the respective power generating cells 11a and 11b are controlled with greater accuracy by using the heating unit 14 and the corresponding thermoelectric converters 13a and 13b.

[c] Third Embodiment

Figure 15:
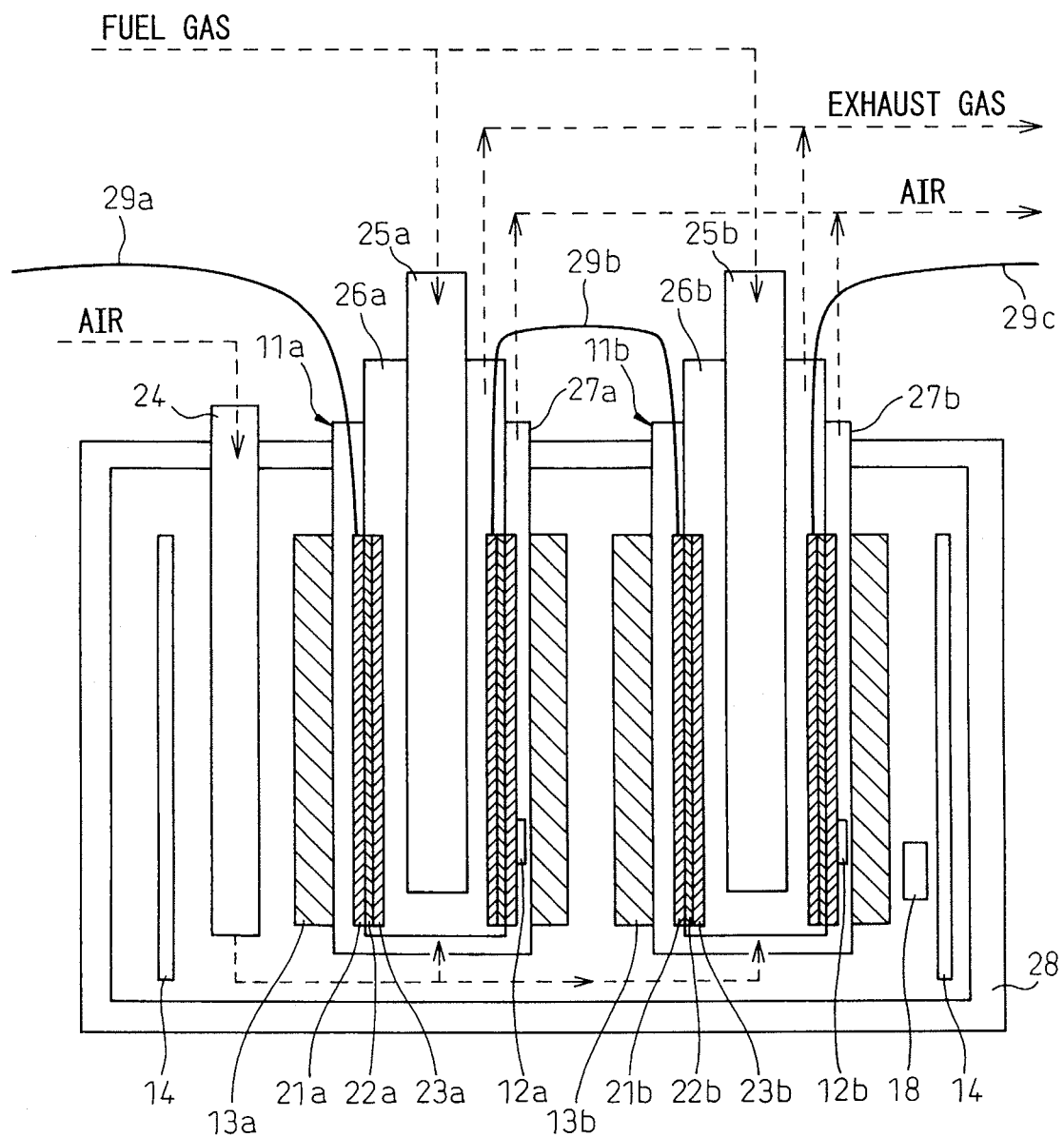
FIG. 15 is a diagram illustrating the essential portions of the power generating system of FIG. 14.
Figure 16:
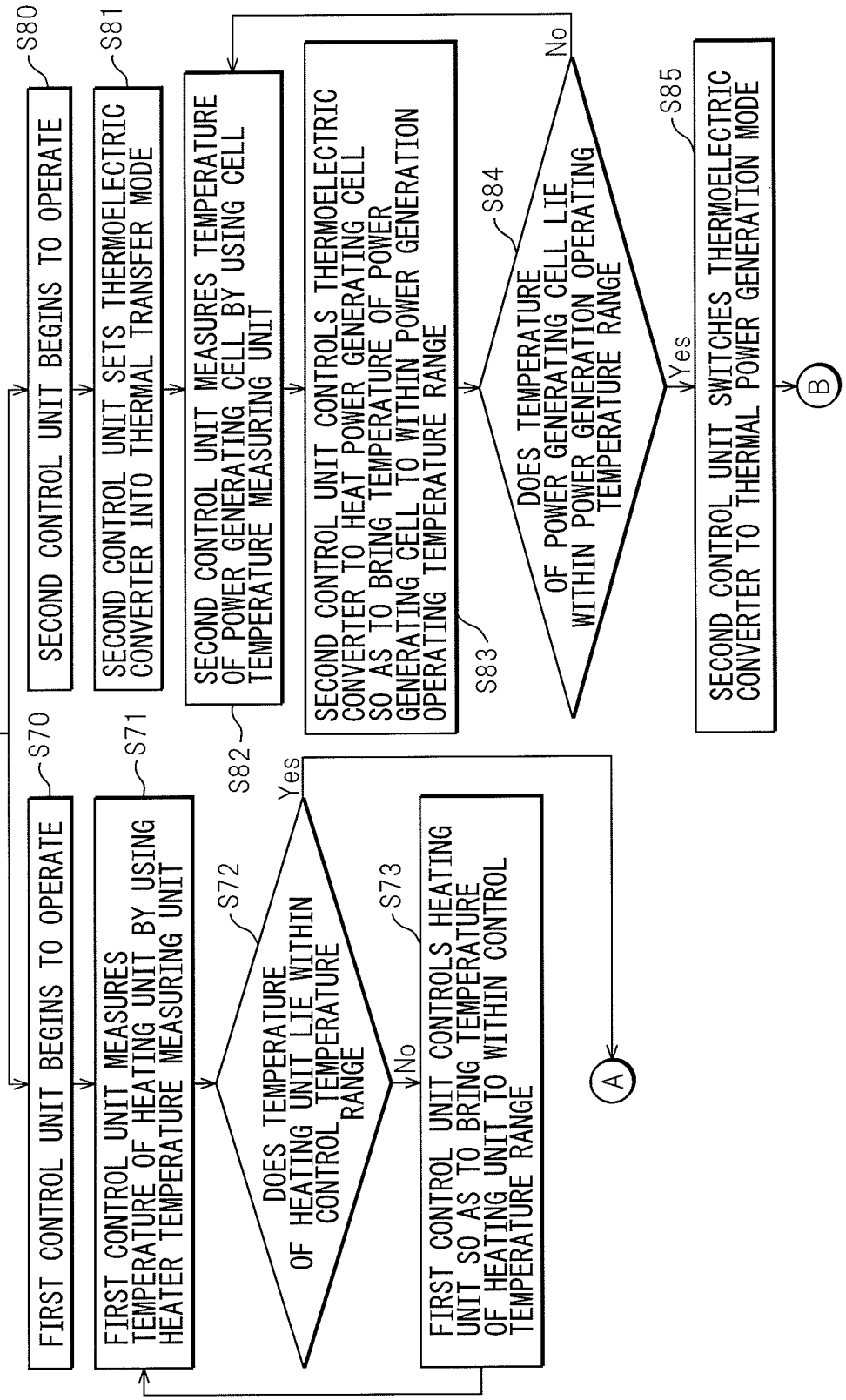
FIG. 16 is a flowchart illustrating the temperature control performed after starting up the power generating system of FIG. 14.

FIG. 14 is a block diagram illustrating the third embodiment of the power generating system disclosed in this specification. FIG. 15 is a diagram illustrating the essential portions of the power generating system of FIG. 14. FIG. 16 is a flowchart illustrating the temperature control performed when starting up the power generating system of FIG. 14.

The power generating system 10 of this embodiment includes a heater temperature measuring unit 18 for measuring the temperature of the heating unit 14. The first control unit 15 can measure the temperature of the heating unit 14 by using the heater temperature measuring unit 18.

As depicted in FIG. 15, the heater temperature measuring unit 18 is disposed between the heating unit 14 and the second cell assembly Cb.

As a result, in the power generating system 10 of this embodiment, the first control unit 15 need not estimate the temperature of the heating unit 14 by using the table T illustrated in the first embodiment.

Otherwise, the configuration of the power generating system 10 of this embodiment is the same as that of the first embodiment.

Next, the temperature control operation performed when starting up the power generating system 10 will be described below with reference to FIG. 16.

First, as illustrated in FIG. 16, when the generating system 10 is started up, the first control unit 15 begins to operate in step S70. Air is introduced through the air inlet tube 24, and a fuel gas is introduced through the fuel inlet tubes 25a and 25b.

Next, in step S71, the first control unit 15 measures the temperature Th of the heating unit 14 by using the heater temperature measuring unit 18.

Next, in step S72, the first control unit 15 determines whether the temperature of the heating unit 14 lies within the control temperature range Tcon. If the temperature of the heating unit 14 lies within the control temperature range Tcon, the process proceeds to step S30 in FIG. 11. On the other hand, if the temperature of the heating unit 14 does not lie within the control temperature range Tcon, the process proceeds to step S73.

In step S73, the first control unit 15 controls the heating unit so as to bring the temperature Th of the heating unit 14 to within the control temperature range Tcon.

The operation of the second control units 16a and 16b is the same as that described in the first embodiment, except that the second control unit 16a does not control the thermoelectric converter 13a in the thermal transfer mode so that heating or cooling of the power generating cell 11a and power generation by the thermoelectric converter 13a are performed in alternating fashion.

In the present invention, the power generating system of each of the above embodiments and its control method may be modified in various ways without departing from the spirit and scope of the invention. For example, the number of cell assemblies each incorporating a power generating cell may be increased to three or more.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A control method for a power generating system which comprises a plurality of cells forming a fuel cell battery for generating power, a cell temperature measuring unit, provided for each of said cells, for measuring temperature of a corresponding one of said cells, a thermoelectric converter provided for each of said cells and having a thermal transfer mode and a thermal power generation mode, a heating unit which heats said plurality of cells, a first control unit which controls said heating unit and a second control unit, provided for each of said thermoelectric converters, for controlling a corresponding one of said thermoelectric converters, comprising:

said first control unit controlling said heating unit so as to bring the temperature of said heating unit to within a predetermined control temperature range; and each said second control unit performing control so that if the temperature of said corresponding cell lies outside a predetermined operating temperature range, said thermoelectric converter is switched to said thermal transfer mode and is controlled so as to bring the temperature of said corresponding cell to within said predetermined operating temperature range and, if the temperature of said corresponding cell lies within said predetermined operating temperature range, said thermoelectric converter is switched to said thermal power generation mode.

2. The control method for the power generating system according to claim 1, wherein each said second control unit controls said thermoelectric converter so that, in said thermal transfer mode, heating or cooling of said cell and power generation by said thermoelectric converter are performed in alternating fashion, and said first control unit obtains the temperature of said heating unit by using a voltage value representing the power generated by said thermoelectric converter.

3. The control method for the power generating system according to claim 2, wherein said thermoelectric converter has a cell side which faces said corresponding cell and a heater side which faces said heating unit located on a side opposite from said cell side, and said first control unit obtains the temperature of said heating unit by using the temperature of said cell measured by said cell temperature measuring unit and the voltage value of the power generated by said thermoelectric converter, and by referring to a table that indicates relationships between the temperature of said cell, the voltage value of the power generated by said thermoelectric converter, and a temperature measured at said heater side of said thermoelectric converter.

4. The control method for the power generating system according to claim 1, wherein said first control unit controls said heating unit and each said second control unit controls said thermoelectric converter, based on a relationship between the temperature of said heating unit and the predetermined control temperature range of said heating unit and on a relationship between the temperature of said cell measured by said cell temperature measuring unit and the predetermined operating temperature range of said cell.

5. A power generating system comprising:

a plurality of cells forming a fuel cell battery for generating power;

a cell temperature measuring unit, provided for each of said cells, for measuring temperature of a corresponding one of said cells;

a thermoelectric converter provided for each of said cells and having a thermal transfer mode and a thermal power generation mode;

a heating unit which heats said plurality of cells;

a first control unit which controls said heating unit; and a second control unit, provided for each of said thermoelectric converters, for controlling a corresponding one of said thermoelectric converters, and wherein:

said first control unit controls said heating unit so as to bring the temperature of said heating unit to within a predetermined control temperature range, and each said second control unit performs control so that if the temperature of said corresponding cell lies outside a predetermined operating temperature range, said thermoelectric converter is switched to said thermal transfer mode and is controlled so as to bring the temperature of said corresponding cell to within said predetermined operating temperature range and, if the temperature of said corresponding cell lies within said predetermined operating temperature range, said thermoelectric converter is switched to said thermal power generation mode.

6. The power generating system according to claim 5, wherein said heating unit is arranged in such a manner as to encircle said plurality of cells.

* * * * *